US010428792B2

(12) United States Patent
Illing

(10) Patent No.: US 10,428,792 B2
(45) Date of Patent: Oct. 1, 2019

(54) WIND TURBINE CONTROL SYSTEM

(71) Applicant: Illing Engineering Services

(72) Inventor: Wes Illing, Parksville, NY (US)

(*) Notice: Subject to any disclaimer, the term of this patent is extended or adjusted under 35 U.S.C. 154(b) by 968 days.

(21) Appl. No.: 14/773,894

(22) PCT Filed: Mar. 11, 2014

(86) PCT No.: PCT/US2014/023713
§ 371 (c)(1),
(2) Date: Sep. 9, 2015

(87) PCT Pub. No.: WO2014/164891
PCT Pub. Date: Oct. 9, 2014

(65) Prior Publication Data
US 2016/0017865 A1   Jan. 21, 2016

Related U.S. Application Data

(60) Provisional application No. 61/776,709, filed on Mar. 11, 2013.

(51) Int. Cl.
*F03D 7/02* (2006.01)
*F03D 7/04* (2006.01)

(52) U.S. Cl.
CPC ........... *F03D 7/0224* (2013.01); *F03D 7/04* (2013.01); *F03D 7/041* (2013.01);
(Continued)

(58) Field of Classification Search
CPC .......... F03D 7/0224; F03D 7/04; F03D 7/041; F05B 2260/78; F05B 2260/79; Y02E 10/723
(Continued)

(56) References Cited

U.S. PATENT DOCUMENTS 4,772,182 A   9/1988   Witte
6,609,889 B1  8/2003   Vilsboll
(Continued)

FOREIGN PATENT DOCUMENTS

CN   1727672 A    2/2006
CN   202023693 U  11/2011
(Continued)

OTHER PUBLICATIONS

European Patent Office Search Report for EP Application No. 14 77 9812 dated Dec. 16, 2016 (5 pages).
(Continued)

*Primary Examiner* — Mark A Laurenzi
*Assistant Examiner* — Paul W Thiede
(74) *Attorney, Agent, or Firm* — Harris Beach PLLC

(57) ABSTRACT

A wind turbine includes a hub sub-system comprising a main hub and a shaft adapted to rotate about an axis, and a plurality of turbine blades having a pitch angle. The blades are adapted to drive the rotation of the hub sub-system to a first speed. The wind turbine further includes a pitch drive sub-system including a driving element adapted to rotate about the axis at a second speed, and further adapted to control the pitch angle of the turbine blades in relation to a difference between the first speed and the second speed. A slip enhanced generator enables the hub sub-system to rotate at a different speed than the pitch drive sub-system. The difference in speed is governed by a slip function. The wind turbine further includes an active control system adapted to control the second speed of the driving element.

24 Claims, 20 Drawing Sheets

(52) U.S. Cl.
CPC ....... *F05B 2260/78* (2013.01); *F05B 2260/79* (2013.01); *Y02E 10/723* (2013.01)

(58) Field of Classification Search
USPC .................................................... 416/1, 155
See application file for complete search history.

(56) References Cited

U.S. PATENT DOCUMENTS

| | | |
|---|---|---|
| 8,096,762 B2 | 1/2012 | Risager et al. |
| 8,334,610 B2 | 12/2012 | Migliori |
| 2010/0014971 A1 | 1/2010 | Risager et al. |
| 2010/0209245 A1 | 8/2010 | Migliori |
| 2011/0320052 A1* | 12/2011 | Yasugi ...................... H02J 3/16 700/287 |

FOREIGN PATENT DOCUMENTS

| | | |
|---|---|---|
| CN | 102322394 A | 1/2012 |
| DE | 4221783 A1 | 1/1994 |
| WO | WO-00/09885 A1 | 2/2000 |
| WO | WO-0173518 A1 | 10/2001 |

OTHER PUBLICATIONS

U.S. International Search Report and Written Opinion of the International Searching Authority for International Patent Application No. PCT/US2014/023713 dated Jul. 14, 2014 (10 pages).

\* cited by examiner

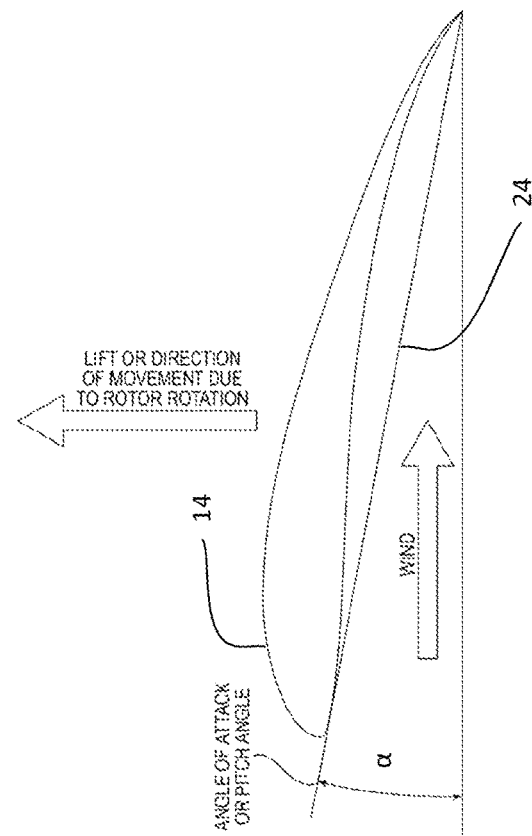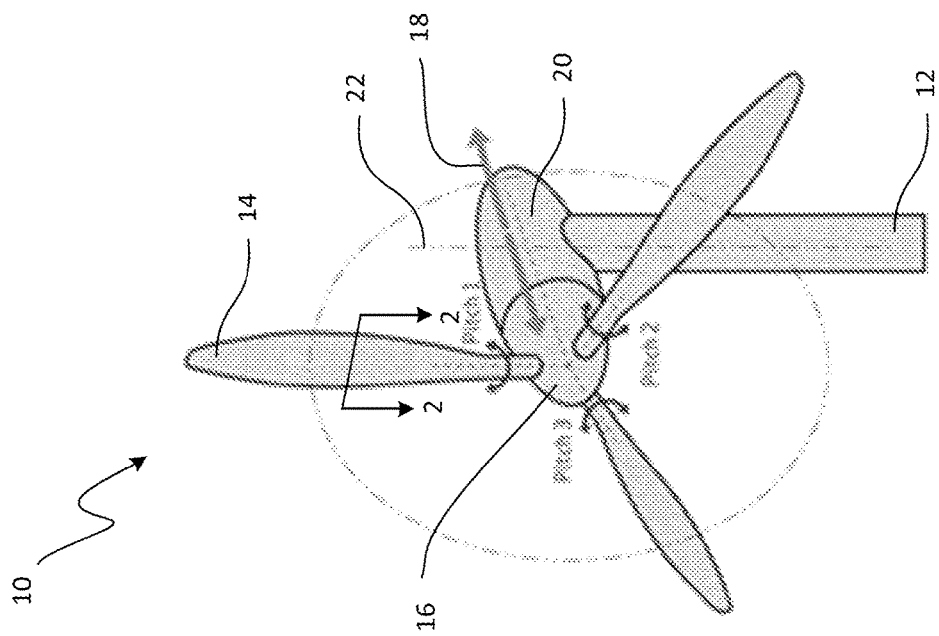

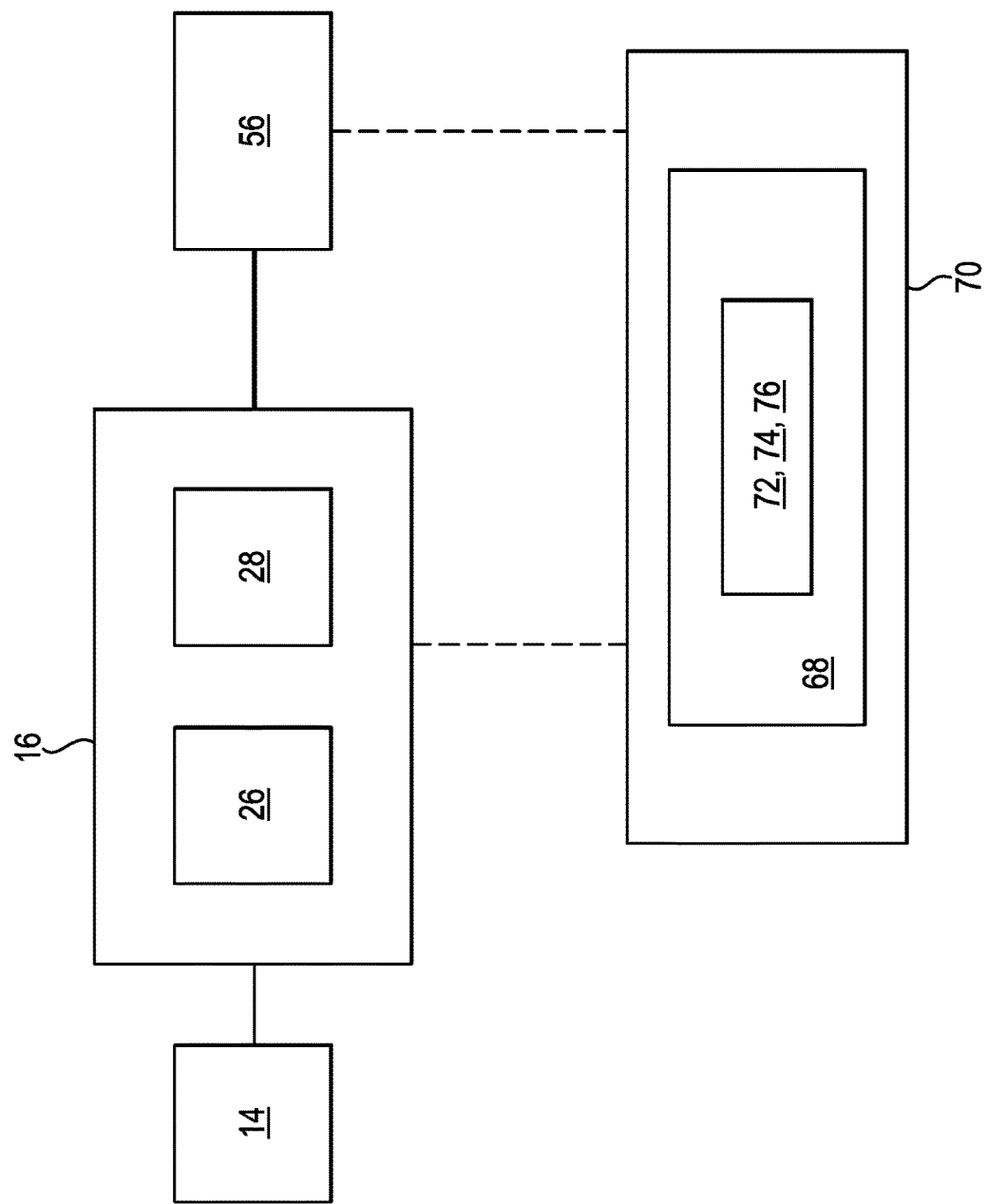

WIND TURBINE CONTROL SYSTEM

CROSS REFERENCE TO RELATED APPLICATION

Reference is made to and this application claims priority from and the benefit of U.S. Provisional Application Ser. No. 61/776,709, filed Mar. 11, 2013, entitled "WIND TURBINE WITH ADVANCED CONTROL SYSTEM", which application is incorporated herein in its entirety by reference.

FIELD OF THE INVENTION

This disclosure relates generally to wind turbines and, more specifically, to controlling blade pitch angle.

BACKGROUND OF THE INVENTION

A wind turbine generally includes two or more rotor blades secured to a hub that is rotatably coupled to a shaft. The shaft is mounted within a housing or nacelle, which may be positioned on top of a tower. The rotation of the bladed hub transforms wind energy into a rotational torque or force that drives one or more generators coupled to the shaft.

Wind gusts have been a formidable hurdle facing modern wind turbine designers. Sudden appreciable changes in wind velocity and/or direction can over-stress or damage components and result in premature failure of the wind turbine. Early efforts to mitigate the negative effects of wind gusts focused on mechanically changing the pitch angle of the rotor blades using a technique commonly known as auto-furling, in which a pitch drive system changes the pitch angle of the rotor blades, thereby changing the aerodynamic torque of the rotor.

While not very precise, auto-furling tended to reduce high failure rates, but not enough to satisfy design margins over the long-term. Subsequent efforts by electrical engineers focused on slip-enhanced electrical designs. This approach allowed the generator to slip much more than normal when the wind provided more power than the system was designed for and thereby created a little time for the pitch control system to respond to the new wind conditions. While slip-enhanced electrical designs proved superior over the mechanical auto-furling approach, but these designs proved inadequate as well. The changes in wind velocity and/or direction simply occur faster than control systems can adapt. For example, even with current high-speed data acquisition systems and signal conditioning units, a wait time or delay of 50 milliseconds is not an unreasonable expectation, and good sensor information could take significantly longer. Aside from the time lag in acquiring and conditioning useful signal data, the system must then respond in a timeframe that prevents damage.

Wind gusts vary widely. In general, higher steady state wind speeds have gusts with lower relative magnitudes. For example, wind gusts might double a steady state wind speed of 12 miles per hour (mph), peaking at 24 mph, but a 30 mph steady state wind speed might gust to only 50 mph. In addition to the magnitude of the gust, its duration is a very significant variable. Long duration wind gusts allow a control system to respond in time, and very short duration wind gusts are effectively attenuated by inertial effects. Unfortunately, wind gust durations between 3 and 6 seconds are very common, but not long enough for the control system to respond in time, and too long for the inertia of the system to simply absorb. The 3-6 second gust imposes one of the most difficult torque and power transient conditions designers must address and both mechanical solutions and electrical solutions have proved inadequate. Historically, this has forced a trade-off between a robust design and a reasonable cost. Engineering and quality assurance departments compromise with marketing and sales departments to mitigate cost increases for robust designs in exchange for "reasonable" failure rates in the field. Current failure rates of transmissions alone cost approximately $50,000 per year per megawatt. This cost is borne by the customers, investors, insurance companies, and manufacturers in various degrees. While insurance companies may have been the first to limit their exposure to transmission failure costs, investors and customers will soon follow.

SUMMARY OF THE INVENTION

In accordance with one aspect of the disclosure, a wind turbine includes a hub sub-system comprising a main hub and a shaft adapted to rotate about an axis, and a plurality of turbine blades having a pitch angle. The blades are adapted to drive the rotation of the hub sub-system to a first speed. The wind turbine further includes a pitch drive sub-system. The pitch drive sub-system includes a driving element adapted to rotate about the axis at a second speed, and further adapted to control the pitch angle of the turbine blades in relation to a difference between the first speed and the second speed. The wind turbine further includes a slip enhanced generator coupled to the hub sub-system and the pitch drive sub-system. The slip enhanced generator enables the hub sub-system to rotate at a different speed than the pitch drive sub-system. The difference in speed is governed by a slip function. The wind turbine further includes an active control system adapted to control the second speed of the driving element.

In accordance with another aspect of the disclosure, a method for controlling a wind turbine blade pitch angle includes the steps of providing a hub sub-system comprising a main hub and a shaft, providing a plurality of turbine blades having a pitch angle, driving, by the turbine blades, the rotation of the hub sub-system about an axis to a first speed, and providing a pitch drive sub-system comprising a driving element adapted to rotate about the axis independently from the hub sub-system. The method further includes the steps of controlling, by an active control system, the driving element to rotate at a second speed, and controlling the pitch angle of the turbine blades by the driving element when the first speed is different from the second speed.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 1 depicts a perspective view of a wind turbine according to one embodiment of the present invention;

FIG. 2 depicts a cross-sectional view through a turbine blade shown in FIG. 1;

FIG. 21 is a block diagram collectively presenting an exemplary embodiment of a wind turbine.

DETAILED DESCRIPTION OF THE INVENTION

Figure 3:
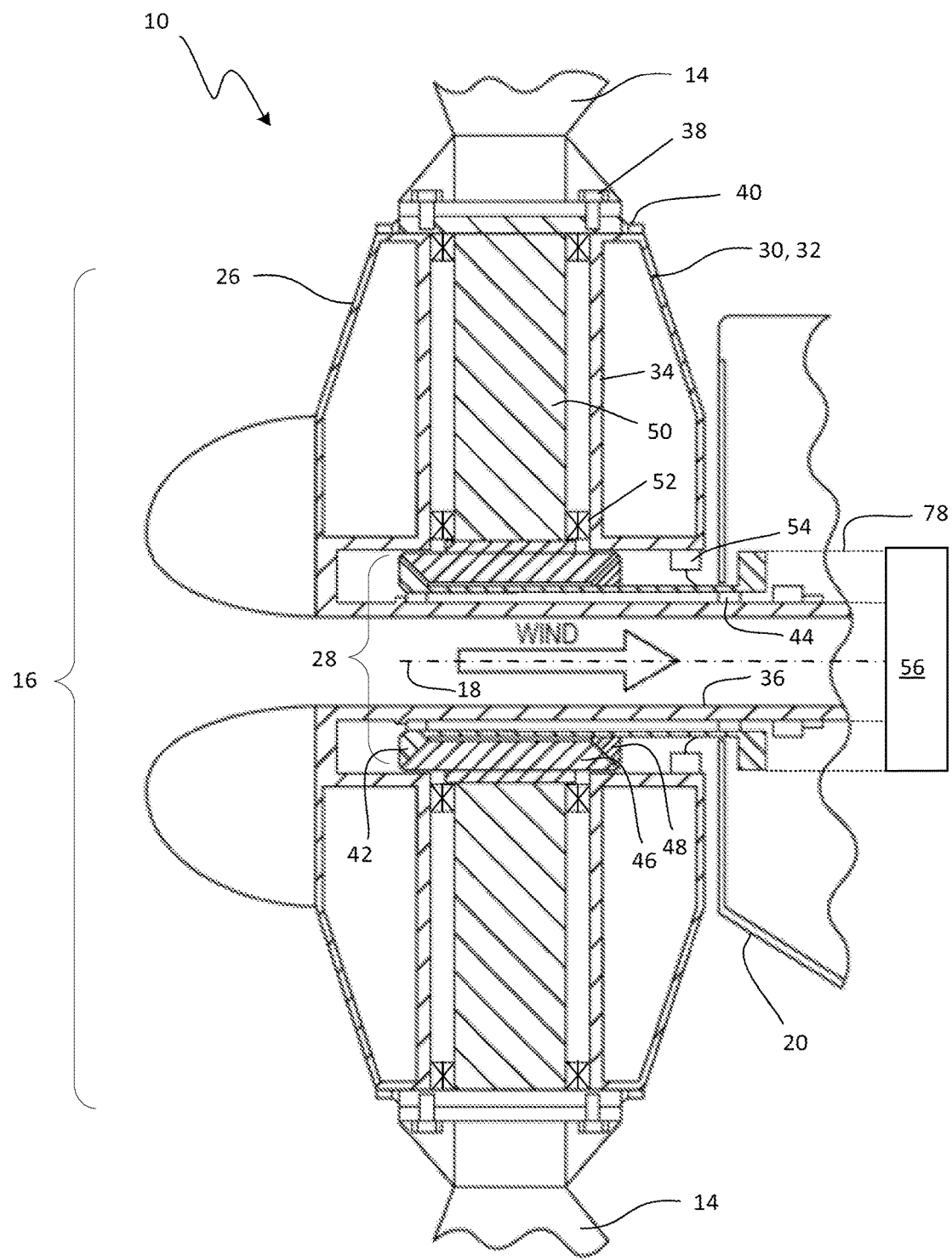
FIG. 3 depicts a side cross-sectional view of a wind turbine according to one embodiment of the present invention.

The inventor of the present invention believes common wind gusts have been largely responsible for the high failure rate in transmissions. Failure to install flexible couplings between the rotor shaft and the transmission input shaft and poor transmission design or manufacture may be partly responsible, but wind gusts have significantly exacerbated the issue. Disclosed herein is an automated pitch control system that actively manages energy extracted from the wind using an electro-mechanical systems design approach, thereby preventing damaging torque levels from entering the system. It does this for virtually any wind speed, any gust magnitude, and any gust duration.

Referring to FIG. 1, a wind turbine 10 according to one embodiment of the invention is shown rotatably mounted on top of a tower 12. The wind turbine 10 includes a plurality of turbine blades 14 secured to a pitch control hub assembly 16 rotating about a generally horizontal axis 18. Three blades are shown in the illustrated example, but the actual number may depend upon the particular needs of the application. The pitch control hub assembly 16 includes a rotor shaft coupled to an electrical generator within a nacelle 20. The nacelle 20 may be coupled to the tower 12 by a passive or active yaw bearing assembly (not shown) that permits the wind turbine to pivot about a vertical or yaw axis 22. In this manner, the wind turbine 10 may be rotated into the direction of the wind for best performance. The wind turbine 10 includes a blade pitch control system that rotates the turbine blades 14 about a pivot axis 23 which, in most embodiments, is the radial centerline of the blade. The rotation about the pivot axis 23 will increase or decrease the pitch angle or angle of attack of the blade.

Referring to FIG. 2, a cross-sectional view through a turbine blade 14 is shown. As used herein, the angle of attack, or pitch angle α, refers to the angle between the chord line 24 of the turbine blade 14 and the vector representing the oncoming wind. The chord line 24 is defined as the imaginary straight line joining the leading and trailing edges of the blade airfoil. The blade pitch control system disclosed as part of the invention herein can rapidly decrease the angle of attack in proportion with an increase the rotational speed of the hub, thereby unloading the aerodynamic torque or forces on the wind turbine.

Turning now to FIG. 3, a wind turbine 10 according to one embodiment of the present invention includes an automated pitch control system having a pitch control hub assembly 16, a slip-enhanced generator, and an adaptive active control system. The pitch control hub assembly 16 includes two rotating subsystems: a rotating hub sub-system 26 and a rotating pitch drive sub-system 28. The hub sub-system 26 and the pitch drive sub-system 28 rotate independently, and an increase in the rotational speed of the hub sub-system 26 relative to the rotational speed of the pitch drive sub-system 28 causes a reduction in the angle of attack of the turbine blades 14. Similarly, increases in the rotational speed of the pitch drive sub-system 28 relative to the hub sub-system 26 causes an increase the angle of attack of the turbine blades 14.

In the embodiment illustrated in FIG. 3, the hub sub-system 26 includes a rotating main hub 30 which may include an outer casing 32 extending circumferentially about the entire pitch control hub assembly 16, a radially-extending, internal cylindrical blade support 34 surrounding the pitch drive portion of each turbine blade 14, and an inner shaft 36 extending along the axis 18. The inner shaft 36 may couple to a gearbox, or to one or more electrical generators, for example. A dirt seal 40, such as an O-ring or glandular elastomeric ring, may be used to protect the rotating portions of the pitch control hub assembly 16 from environmental contaminants.

In one embodiment, the pitch drive sub-system 28 may be a simple set of bevel gears driven by a beveled driving gear. In one example, the pitch drive sub-system 28 includes a driving gear 42 to couple with the hub sub-system 26. In the illustrated embodiment, the driving gear 42 is a bevel gear supported on the inner shaft 36 of the hub sub-system 26 by bearings 44, which in one example may be ball bearings, roller bearings, or bushings. The driving gear 42 is coupled to a driven gear 46, which, in the illustrated embodiment, is one or more bevel gears adapted to translate the relative difference in rotor speeds between the hub sub-system 26 and the pitch drive sub-system 28 to a change in pitch angle of the turbine blades 14. Other constructions to couple the hub sub-system 26 to the pitch drive sub-system 28 are contemplated within the scope of the invention, as long as an increase in the rotational speed of the hub, relative to the pitch drive rotor 28, results in a decrease in the turbine blade angle of attack.

The number of driven gear(s) 46 is determined by the number of blades the designer desires. The number of blades connected to the pitch control hub assembly 16 is limited only by practical limitations imposed by the designer.

In one embodiment, the driving gear 42 may have a sister gear 48 which acts as an idler but provides thrust to oppose the driving gear. The idler gear 48 does not impose any torques on any components in the system but it does balance the thrust load across the driven gear(s) 46.

The pitch drive sub-system 28 further includes a blade shaft 50 that couples the driven gear 46 to the root of turbine blade 14. The cylindrical shaft 50 may be supported within each blade support 34 by pitch bearings 52, such as ball bearings, roller bearings, or bushings. The turbine blades 14 may be secured to the main hub 30 by a flanged connection and fasteners 38, for example, or by a splined shaft, or may be integral. Any rotation of the driving gear 42 about the axis 18 relative to the rotation of the hub sub-system will translate to a rotation of the turbine blades 14 about their pivot axis 23 and change the angle of attack.

In one embodiment, the inner shaft 36 and driving gear 42 of the rotating pitch control hub assembly 16 extend into the nacelle 20 and are sealed by a rotary seal 54.

As noted above, the pitch control hub assembly 16 further includes a slip enhanced generator 56. As used herein, a slip enhanced generator 56 is a system which enables the rotating hub sub-system 26 to turn faster than the rotating pitch drive sub-system 28 in order to reduce the hub pitch angle and angle of attack α to prevent torque and power levels from exceeding the capacities of the transmission and/or the electrical power generating system. The differential rotational rates enabled by the slip enhanced generator 56 are herein referred to as "slip." In one example, a slip enhanced generator 56 can offer a slip function 58 of any shape, from a simple single straight line or as complex as the imagination can create. The shape of the slip function 58 should fit the needs of the system design. In one example, this would allow very little slip or no slip when the system is operating within its design limits for torque and power levels and enable significantly higher rates of slip at torque and power levels above the design limits.

The differential rotational rates enabled by the slip enhanced generator 56 (e.g., slip) can be constructed by a number of methods, and all are contemplated within the scope of the invention. In one example, slip could be produced by a clutch or transmission which allows the rotating hub sub-system 26 to turn faster when torque and/or power levels increase suddenly or suddenly exceed the design limits. The clutch or transmission could be electrical, magnetic, mechanical, hydraulic or any combination of these.

In another example, slip could be produced by a generator which allows the rotating hub sub-system 26 to turn faster when torque and/or power levels increase suddenly or suddenly exceed the design limits or, as in a variable speed generator, which turns faster when torque or power levels increase equating its operation to slip.

In yet another example, slip could be produced by a generator control system which allows the rotating hub sub-system 26 to turn faster when torque and/or power levels increase suddenly or suddenly exceed the design limits.

In a further example, slip could be produced by a combination of any of the above examples. The number of slip enhanced generators 56 is limited only by practical limitations imposed by the designer.

In operation, under steady state conditions, the driving gear 42 independently rotates at precisely the same speed (e.g., RPM) as the hub sub-system 26. When a transient wind gust is imposed on the system, the driving gear 42 continues to rotate at the same speed as it did during steady state conditions. Slip in the slip enhanced generator 56 allows the hub sub-system 26 to increase in rpm under transient increases in wind speed. When the hub sub-system 26 rotates faster than the steady state rotation, the driven gear(s) 46 are forced to rotate about their axis, thereby turning the turbine blades 14 and reducing the hub pitch angle(s) and the angle of attack. Thus, the hub pitch angle and the angle of attack are automatically and immediately reduced by the simple gear train in the pitch drive sub-system 28. The rates at which the hub pitch angle and the angle of attack are reduced is simply a function of the difference in rotational speed of the hub sub-system 26 and the steady state speed of the driving gear 42, and the gear ratio between the driving gear 42 and the driven gear 46. If slip for example has allowed the hub sub-system 26 to increase its speed by 1 RPM and the gear ratio were 1:1, then the hub pitch angle and the angle of attack are reduced at 1 RPM, or a rate of 6 degrees per second. If wind speed and the hub sub-system 26 slow down due to a lower slip value in the slip enhanced generator 56, then the driving gear 42 will cause the driven gear 46 to rotate such that the hub pitch angle and the angle of attack is increased. Gear ratios other than 1:1 can be utilized in the pitch drive sub-system 28 to increase or decrease the rate at which the angle of attack is changed as a function of the differential rotational speeds of the shafts for the driving gear 42 and the hub sub-system 26 based on specific system requirements. Typically, the lower the nominal RPM of the rotor, the higher the gear ratio must be. Very large systems, for example, might turn at only 1-2 RPM in order to prevent killing endangered species of birds and bats. This might require significantly higher gear ratios than a system with a nominal rotor speed of 20 RPM, thereby necessitating the use of the equivalent of a multi-stage gearing system.

Bevel gears are just one enabling approach for the pitch drive sub-system 28. Different types of transmission components 78 could be used such as, but not limited to, drive belts or pulleys, or a system of hydraulic or electromechanical devices. The transmission means by which these shaft speeds are interconnected or coupled may vary, provided that increases in the shaft speed for the hub sub-system 26 relative to the shaft speed for the driving gear 42 cause a reduction in the angle of attack and decreases in the shaft speed for the hub sub-system 26 relative to the shaft speed for the driving gear 42 increase the angle of attack.

FIG. 21 is a block diagram collectively presenting the elements of the automated pitch control system as described herein.

Figure 4:
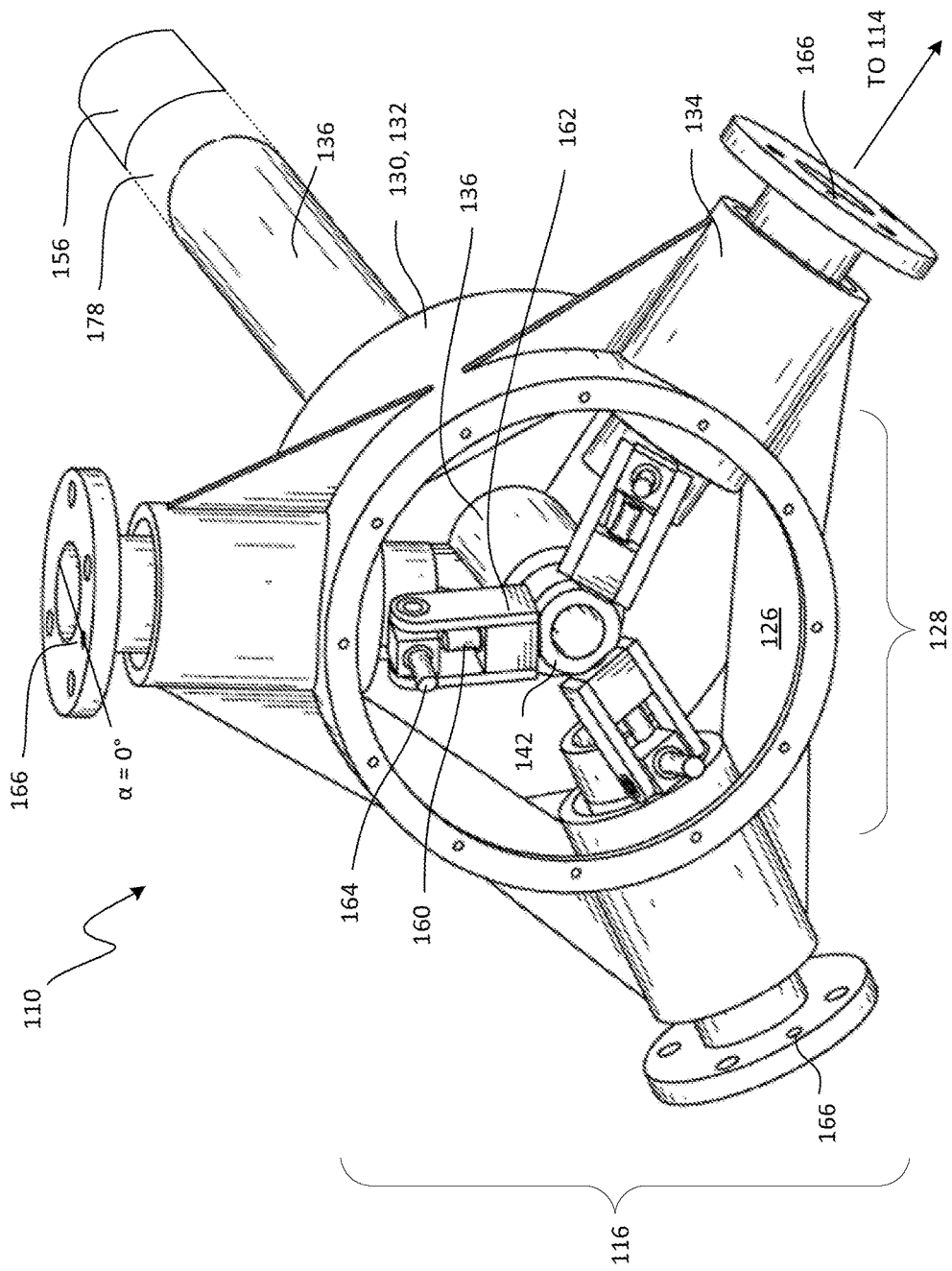
FIG. 4 depicts a front perspective view of a wind turbine according to a first example of another embodiment of the present invention.
Figure 5:
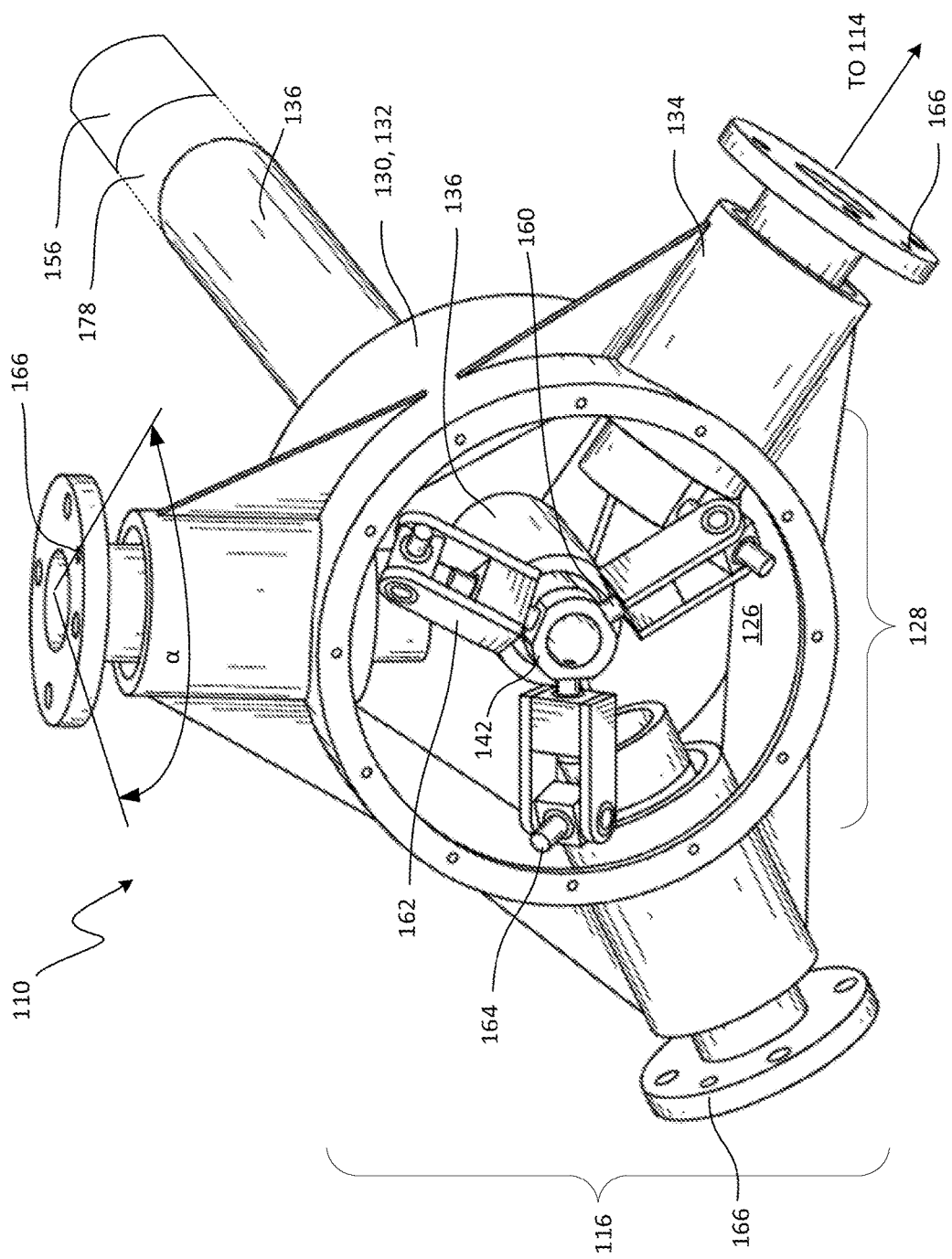
FIG. 5 depicts a second example of the wind turbine shown in FIG. 3.
Figure 6:
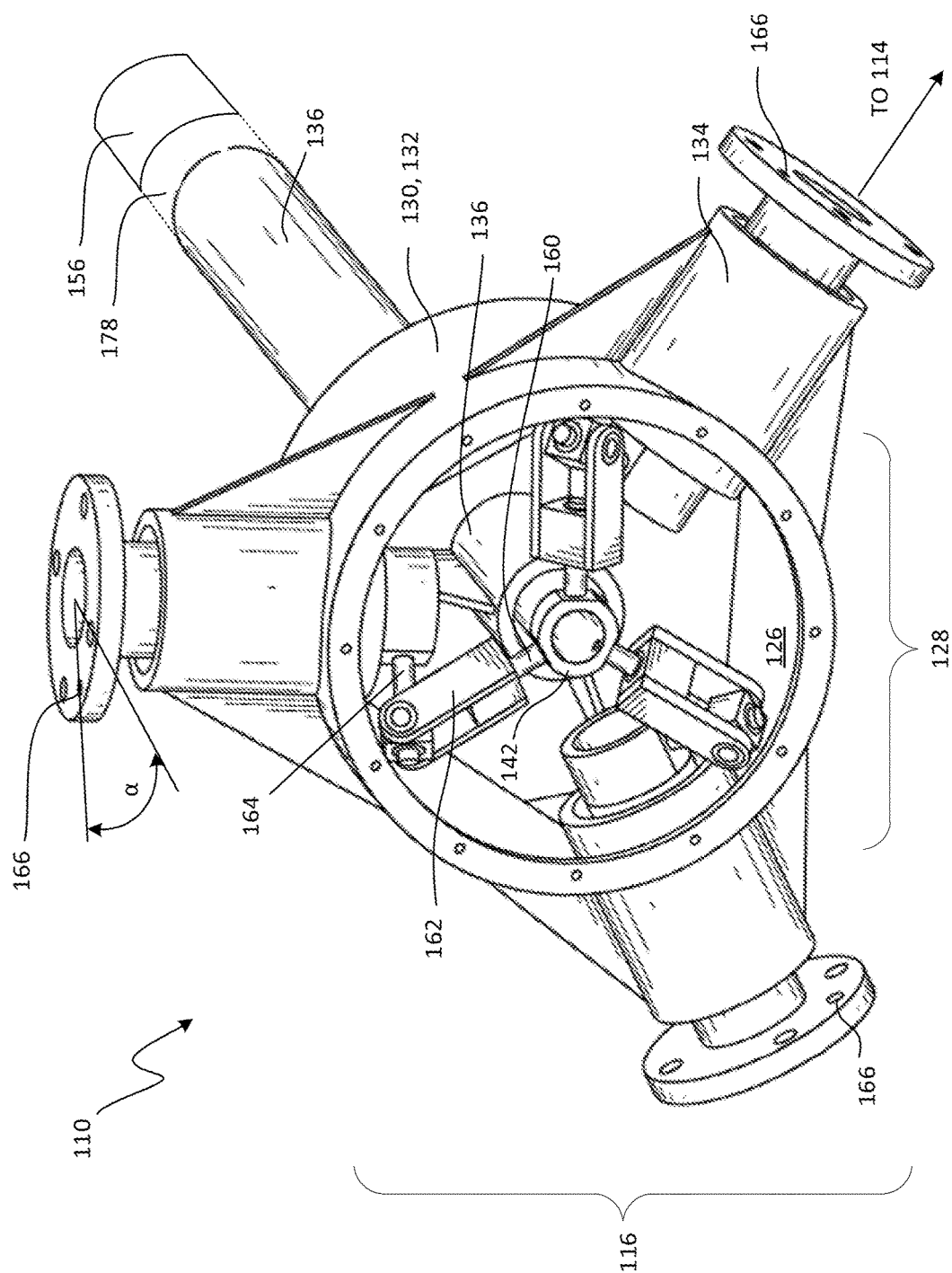
FIG. 6 depicts a third example of the wind turbine shown in FIG. 3.

Turning now to FIGS. 4-6, wherein like numerals are used to indicate like parts from FIG. 3, a wind turbine 110 is shown according to another embodiment of the invention. In this embodiment, an automated pitch control system includes a mechanical linkage rather than a set of bevel gears. A pitch control hub assembly 116 includes two rotating subsystems: a rotating hub sub-system 126 and a rotating pitch drive sub-system 128. The hub sub-system 126 and the pitch drive sub-system 128 rotate independently, and an increase in the rotational speed of the hub sub-system 126 relative to the rotational speed of the pitch drive sub-system 128 causes a reduction in the angle of attack of the turbine blades 114 (not shown).

In the embodiment illustrated in FIG. 4, the hub sub-system 126 includes a rotating main hub 130 to which the turbine blades 114 are secured. The main hub 130 may include an outer casing 132 extending circumferentially about the entire pitch control hub assembly 116, a radially-extending, internal cylindrical blade support 134 surrounding the pitch drive portion of each turbine blade 114, and an outer shaft 136 extending along the axis 118. The outer shaft 136 may couple to a gearbox, or to one or more electrical generators, for example. In the illustrated embodiment the turbine blades 114 may be secured to the main hub 130 by a flanged connection.

The pitch drive sub-system 128 includes a driving shaft 142 at the center of the outer shaft 136 of the hub sub-system 126. The driving shaft 142 includes radially extending driving spokes 160 that couple to a mechanical linkage 162. The linkage 162 in turn couples to rods 164 extending transversely from each blade shaft 150 rotatably housed within the blade supports 134. The spokes 160, linkage 162, and rods 164 are adapted to rotate the pitch angle α of the turbine blades 114 in response to a relative difference in rotor speeds between the main hub 130 and the driving shaft 142.

FIG. 4 depicts the wind turbine 110 at a steady state condition wherein the main hub 130 is rotating at the same speed as the driving shaft 142. A clocking feature 166 on each flange of the blade shaft 150 helps locate the angle of rotation (i.e., angle of attack α) for each of the turbine blades 114.

As noted above, the pitch control hub assembly 116 further includes a slip enhanced generator 156. That is, the slip enhanced generator 156 is a system which enables the rotating hub sub-system 126 to turn faster than the rotating pitch drive sub-system 128 in order to reduce the hub pitch angle and angle of attack α to prevent torque and power levels from exceeding the capacities of the transmission and/or the electrical power generating system. Further included is a transmission component 178 to couple the rotating hub sub-system 126 to the rotating pitch drive sub-system.

Turning now to FIG. 5, shown is the progressive rotation of the driving shaft 142 in a clockwise direction relative to the outer shaft 136 of the rotating hub sub-system 126. In the illustrated embodiment, the turbine blades 114 are mounted to provide a counterclockwise rotation of the hub sub-system 126 when empowered by the wind. Thus, when a wind gust forces an increase in the rotational speed of the rotating hub sub-system 126 and the rotating pitch drive sub-system 128 does not increase its rotational speed, the relative difference between the two moves the linkage 162 as shown. As the driving spokes 160 rotate, the flanges upon which the turbine blades are mounted are forced to rotate as defined by the geometry of the linkage 162, resulting in a clockwise rotation of the driving shaft 142 and reduction in the angle of attack α.

Whether the turbine blades 114 are mounted such that they produce a counterclockwise rotation of the hub sub-system 126 when empowered by the wind, or a clockwise rotation of the hub sub-system 126, the pitch control hub assembly 116 provides the same result. Turning to FIG. 6, shown is the progressive rotation of the driving shaft 142 in a counterclockwise direction relative to the outer shaft 136 of the rotating hub sub-system 126. In the illustrated embodiment, the turbine blades 114 are mounted to provide a clockwise rotation of the hub sub-system 126 when empowered by the wind. Thus, when a wind gust forces an increase in the rotational speed of the rotating hub sub-system 126 and the rotating pitch drive sub-system 128 does not increase its rotational speed, the relative difference between the two moves the linkage 162 as shown. As the driving spokes 160 rotate, the flanges upon which the turbine blades are mounted are forced to rotate as defined by the geometry of the linkage 162, resulting in a counterclockwise rotation of the driving shaft 142 and reduction in the angle of attack α.

Unlike the bevel gear pitch control system 16 disclosed in reference to FIG. 3, a mechanical linkage 162 similar to that disclosed in reference to FIGS. 4-6 does not have a constant gear ratio, due to the geometry of the linkage. The variable gear ratio can be used to the designer's advantage for slight reductions in pitch motor torque requirements under certain transient conditions.

The term 'slip' is also commonly used to define a phenomenon found in standard, low-cost squirrel cage induction generators. For clarity, this phenomenon shall be referred to herein as 'electromagnetic slip'. An induction generator cannot create any power unless the magnetic field of the rotor turns faster than the electric field of the stator. The greater the difference in rotational speeds (e.g., electromagnetic slip), the greater the power output. Standard high-efficiency generators commonly found in industry today offer an electromagnetic slip of about 3% at full rated power. In other words, if a generator was creating 60 Hz power and its nominal operating speed was 900 RPM, electromagnetic slip would be the difference between the 900 RPM (synchronous RPM) of the rotating electric field in the stator and the actual shaft RPM of the rotor. More specifically, for the 3% electromagnetic slip example, at full rated power, the stator would produce an electric field rotating at 900 RPM and the rotor (e.g., generator shaft) would rotate at 927 RPM. Electromagnetic slip is in fact what provides additional reactive torque for the generator as the magnetic fields in the rotor cut through the electric fields of the stator at higher rates. When torque on the input shaft of the generator approaches zero, the speed of the rotor approaches the synchronous RPM of 900. Hence, the electromagnetic slip changes as needed to create the torque required by the generator to match the torque output of the turbine blades. In general, designers try to minimize electromagnetic slip in part because electromagnetic slip creates heat in the generator, which is a waste of energy. Highly efficient generators have very low electromagnetic slip rates, and as such almost all of the input shaft power is converted to electrical power and very little given up as heat. The electromagnetic slip rate, or 'slip function' as used herein, is nearly a straight line for many generators within the range of rated power capacity and continues as a straight line well past the rated power capacity for the generator.

A slip enhanced generator enables changes in the rotational speed of the shaft for the rotating hub sub-system as power levels or torque input levels on the slip enhanced generator are changed. The slip function could be a straight line with a constant slope selected by the designer, or it could be a slightly more complex function such as two connected straight lines with different slopes. The complexity of the slip function depends upon the system needs and the goals of the designer. The inventor of the present invention has found that a relatively simple slip function can satisfy the needs of the wind turbine design by using just two straight lines. In one embodiment, an eight-pole generator was used having a synchronous speed of 900 RPM. As wind speeds provide sufficient power to approach the full rated power of the generator, its slip allows the shaft speed to approach 927 RPM. Hence, the first straight line in the slip function is that of the standard high efficiency generator with a 3% electromagnetic slip rate. If the wind turbine were operating at full rated power and a wind gust momentarily further increased the torque levels on the input shaft of the generator, the RPM would be pushed higher than 927 RPM. At this point, the slip function follows a second line with a different slope than the 3% slope. The second line allows the RPM to slip at 927 RPM at full rated power and up to 971 RPM at 125% of the full rated power, for example. This enhanced slip allows an additional slip of 44 RPM with only a 25% increase in power while only 27 RPM of slip was needed from zero to 100% of the power. The enhanced electromagnetic slip mode of operation enables approximately 6.5 times the electromagnetic slip in the enhanced electromagnetic slip range compared to the electromagnetic slip within the range of operation from zero to full rated power. Under conditions near full rated power this enhanced electromagnetic slip allows the rotating hub to suddenly increase its speed in response to a sudden increase in wind speed, thereby effecting a sudden reduction in the hub pitch angle and angle of attack by virtue of the pitch control hub assembly. As the hub pitch angle and angle of attack is reduced, the input torque levels drop and the power levels can move towards the range of the normal operation with normal electromagnetic slip levels.

Many types of generator configurations are contemplated within the scope of the invention. The slip enhanced generator may be any type or configuration of generator, a requirement being that it allows the RPM of the rotating hub sub-system to increase with increasing torque output in the power range of interest. The exemplary squirrel cage induction generator is one of the most common types due to its low cost, high reliability, and simplicity of manufacture. However, generators can be designed and manufactured with a variety of slip functions or additional components and a generator control system can be provided to create the desired slip function for satisfactory system performance.

In one embodiment, a standard high efficiency squirrel cage induction generator can be altered to change its electromagnetic slip properties as it approaches full rated power. While electromagnetic slip properties can be changed by design within the generator, they can also be created by a generator control system. One such approach could be a 'smart' generator operator. The smart generator operator could be, for example, a device capable of switching power on or off to the generator every time the AC power wave crosses the zero voltage or current line. Hence, with 60 Hz power the smart generator operator could be capable of switching power on or off as often as 120 times per second. When power is turned off or "clipped," the rotor can "freewheel" or speed up because it does not have the electric field of the stator to hold it back. This creates an enhanced electromagnetic slip mode of operation. Any number of power waves between 0 and 120 can be clipped each second within the 60 Hz power cycle. Speed transducers can be used to measure the speed of the generator (RPM) and current transducers can be used to measure the output of the generator in units of amperes. The clipping process sequentially clips more and more wave forms from the power wave such that at 125% of the rated power, the rotor speed is allowed to increase its electromagnetic slip from 927 RPM to 971 RPM. In the disclosed example, if the slip enhanced generator operates on 240 Volt single phase power, its current output could be about 44 amps at full rated power, and about 55 amps at 125% of full rated power. If RPM were to increase from 927 to 971 RPM, then the smart generator operator would allow electromagnetic slip to increase at a rate of 4 RPM/Ampere between 100 and 125% of full rated power. This enhanced electromagnetic slip is significantly higher than the 0.61 RPM/Ampere of electromagnetic slip at power levels below 100% of the rated power.

The smart generator operator could be any device allowing an enhanced slip mode of operation and this enhanced slip mode could begin and end at any percentage of the rated power of the slip enhanced generator and offer any level of slip desired by the designer.

As noted above, the automated pitch control system further includes an adaptive active control system 68. The adaptive active control system 68 may comprise two components: a conventional active control system 70, and an adaptive control function 72. The active control system 70 can enhance power regulation during transient conditions by supplementing the actions taken by the pitch control hub assembly 16 and slip enhanced generator 56. The adaptive control function 72 can enhance the long term performance of the wind turbine by reducing the impact of sensor errors.

Since an active control system needs time to respond correctly, the automated pitch control system disclosed herein can allow the pitch control hub assembly 16 to dominate control of the pitch angle α during short duration transient conditions, and an active control system 70 to supplement its response. Due to the time required to get good data on what is physically occurring in the system, the active control system 70 must rely on the pitch control hub assembly 16 to begin making corrections to the angle of attack α during a transient wind gust while it prepares to issue a change in its commanded pitch angle. The time required to prepare a significantly different pitch command than what existed before the transient wind gust started may take 50-1000 milliseconds, and then the active control system 70 can begin to make corrections based on "old" data. Nevertheless, the active control system 70 can offer significant improvements in the response of the overall system when examined over a 5 or 10 second time span. Useful data for the active control system 70 can be, for example, the speed of the rotating hub sub-system 26, the speed of the rotating pitch drive sub-system 28, the actual hub pitch angle, the desired hub pitch angle, the power output of the generator, the speed in RPM of the generator, the wind speed, and the first, second, third and higher derivatives of these variables as well as various combinations of these variables. The inventor has found using data from the speed of the rotating hub sub-system 26 relative to the speed of the rotating pitch drive sub-system 28, the actual hub pitch angle relative to the desired hub pitch angle, and the angular acceleration of the rotating hub sub-system 26 gave excellent results in supplementing the response of the pitch control hub assembly 16 to a transient wind gust condition.

Under moderately steady state conditions where the slip value of the slip enhanced generator 56 is nearly constant, the pitch control hub assembly 16 does not significantly change the pitch angle α, and the active control system 70 dominates control of the pitch angle.

The adaptive active control system 68 adjusts the hub pitch angle by changing the speed of the rotating pitch drive sub-system 28. Any time the speed of the rotating pitch drive sub-system 28 is less than the rotating speed of the hub sub-system 26, the pitch angle α will decrease. Likewise, any time the pitch drive sub-system 28 rotates faster than the rotating hub sub-system 26 the pitch angle α will increase.

An ideal pitch control system would achieve optimum pitch angles for every wind speed to maximize the annual energy production. Typically, this is attempted by an active control system using sensors for pitch angles and an anemometer to sense wind velocity, and in some cases a predefined database which identifies optimal pitch angles as a function of wind velocity. Unfortunately, both of these sensing systems, including the predefined database, are riddled with errors and, as such, cannot by themselves offer the maximum annual energy production for the system.

Aside from inaccuracies inherent in anemometers due to bias errors, scale factor errors, shading effects by passing blades, and local vortices, one also must address the fact that the point at which the wind velocity is measured is not an accurate representation of the actual wind speed for all of the blade element sections. Across the diameter of the rotor there are gradients in wind speed, and where each rotor falls within that gradient will determine its available power output. This wind velocity gradient may change seasonally as, for example, when the leaves drop from the trees in the fall and wind velocities near the ground increase relative to wind velocities higher up. The only valid assumption one can make regarding the wind speed measurement is that the value is wrong. However, it is reasonable to assume the errors will be relatively constant over short periods of time. Hence, a control system should be capable of correcting the wind sensor outputs based on erroneous, but at least repeatable, sensor inputs.

Sensors measuring the pitch angle $\alpha$ have a similar set of shortcomings. Aside from the bias and scale factor errors there are also have errors inherent in actual blade pitch versus assumed blade pitch, due to mechanical tolerances and the fact that the twist in the blade may change as a function of wind speed. Again, the only valid assumption one can make is that the pitch measurements are wrong, but these errors will be relatively constant over short time periods. Hence, a control system should be capable of correcting pitch angle measurements based on erroneous but repeatable sensor inputs.

Figure 7:
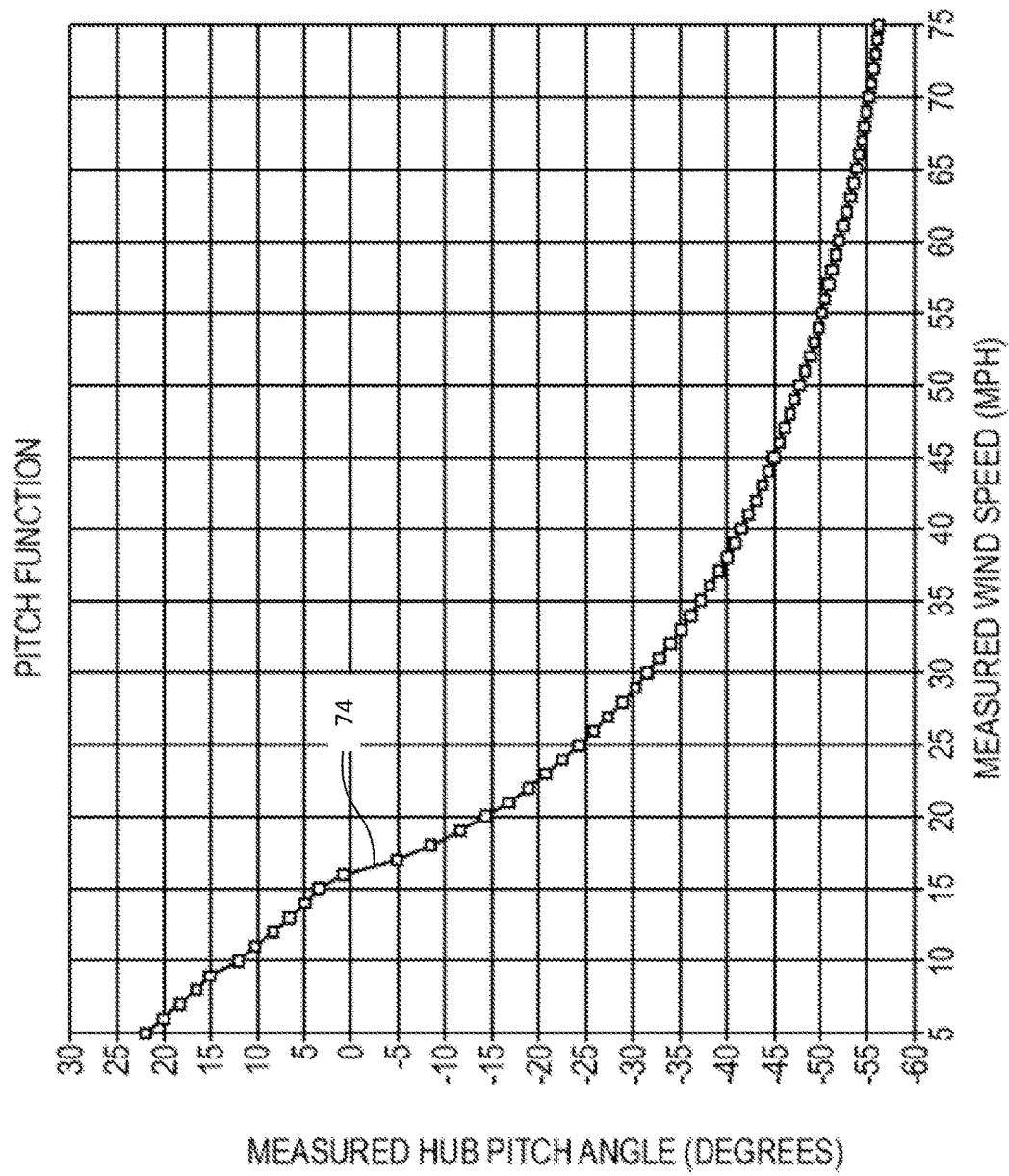
FIG. 7 is a graphical representation of a pitch function according to one embodiment of the present invention.

Unlike an active control system which assumes all sensor values are correct, an adaptive control function assumes all sensor values are incorrect, and then compensates for, and essentially corrects, the errors in both the wind speed sensor and the pitch sensors. In order to accomplish this, a simple assumption must be made: while the magnitude of the sensor errors is an unknown, the errors will be repeatable, and will be constant in the near term, and while they may change over time, the system can change the data in its database at a significantly faster rate than the errors can change. In one embodiment, this changing database can be stored in a pitch function 74. In this particular application, the pitch function 74 is a database containing data defining the optimum measured pitch angle $\alpha$ at any measured wind speed which will provide the maximum desired power output. FIG. 7 graphically illustrates a pitch function 74 according to one embodiment of the present invention.

Figure 8:
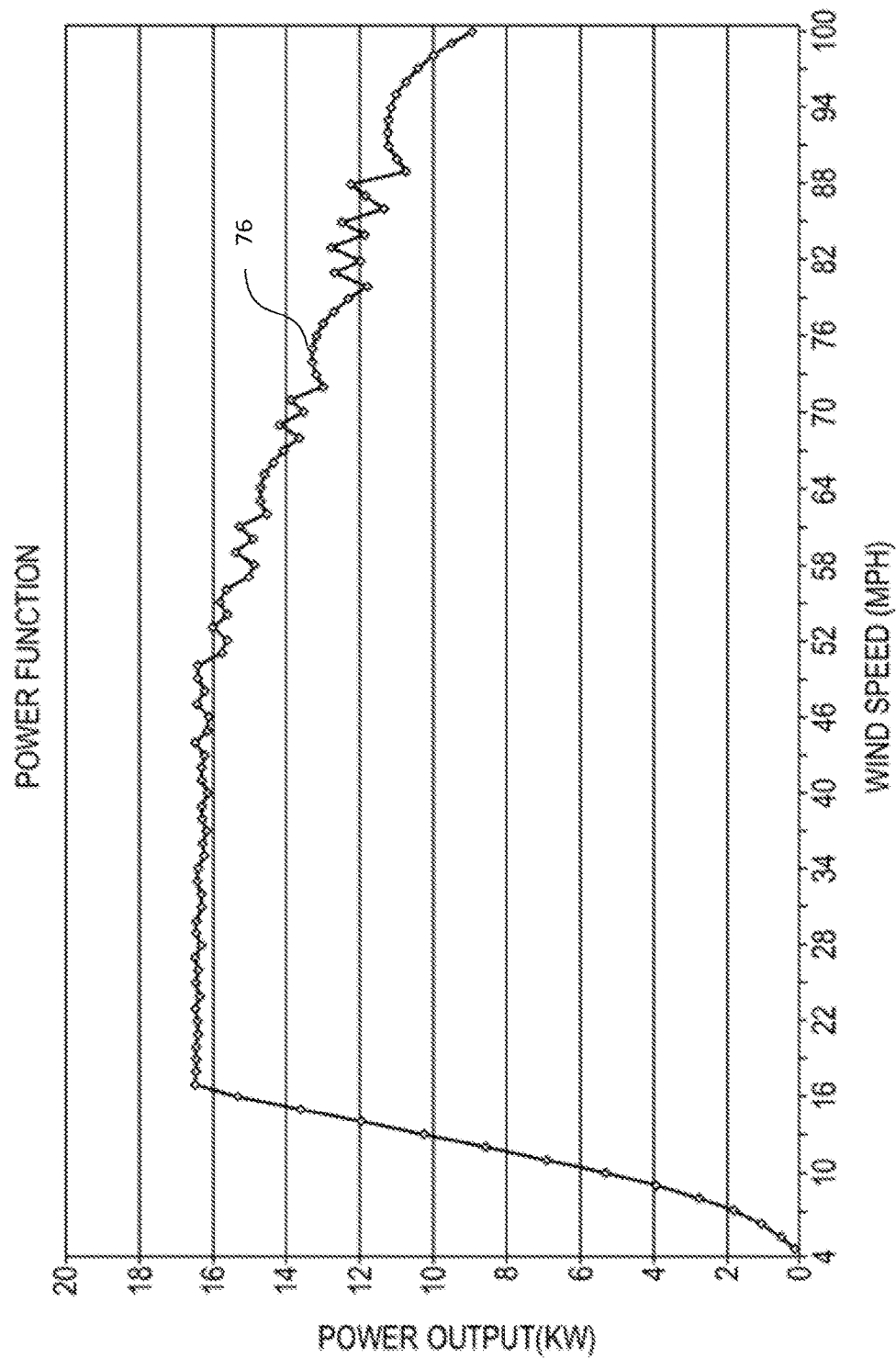
FIG. 8 is a graphical representation of a power function according to one embodiment of the present invention.
Figure 9:
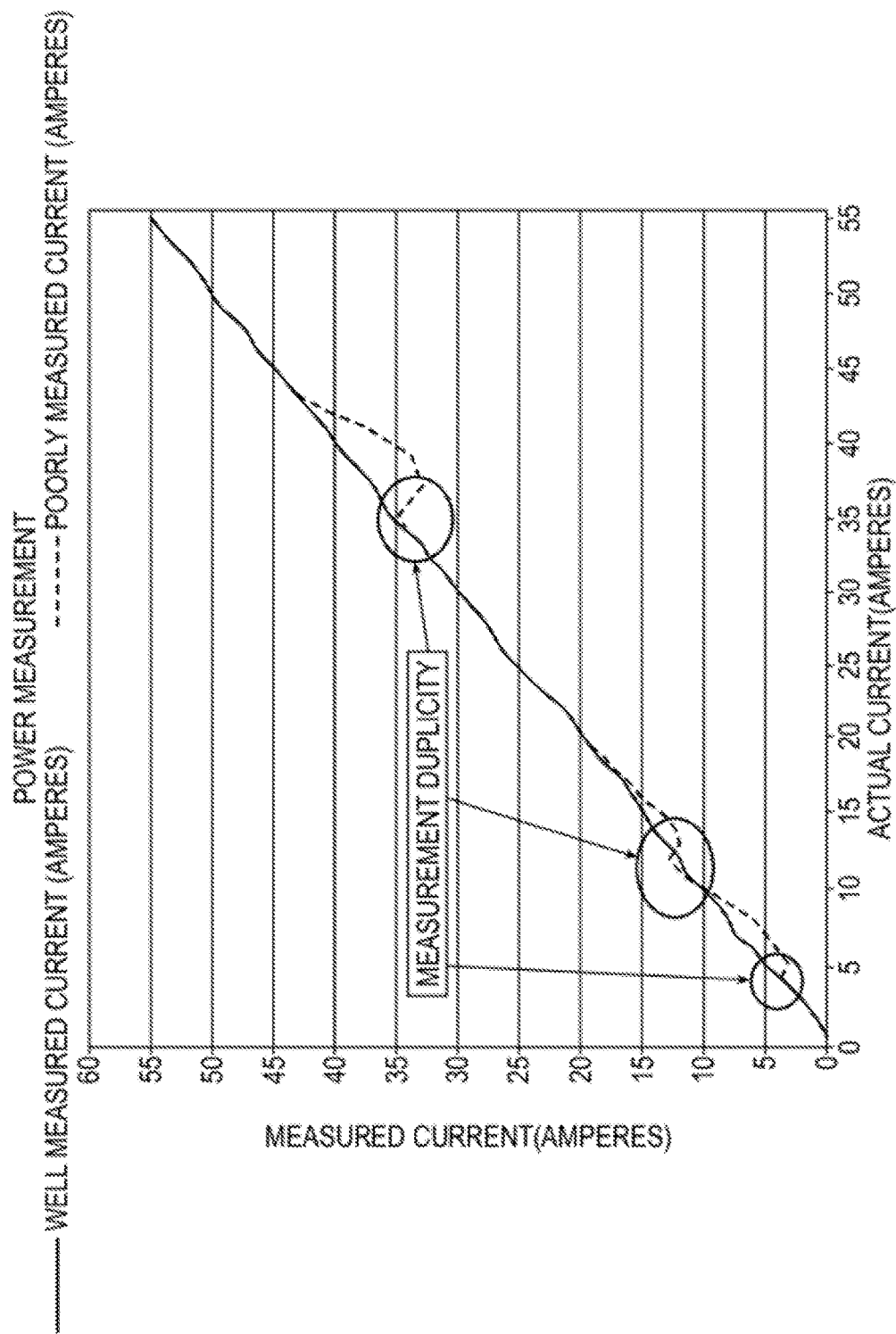
FIG. 9 is a graphical representation of a power measurement according to one embodiment of the present invention.

In addition to the pitch function 74, the adaptive control function 72 also requires a power function 76 to store historically recorded power levels at various wind speeds. FIG. 8 graphically illustrates a power function 76 according to one embodiment of the present invention.

Above some wind speed, the turbine blades will produce more power than the design limits for the system. At and above this wind speed, the optimum pitch angles will be defined as those that limit the power to the design limits of the system. The pitch function 74 can be initially established based on design parameters, but its shape will be modified by the adaptive control function 72 to compensate for errors in measured wind speeds and measured pitch angles. The adaptive control function 72 can continuously or periodically evaluate the accuracy of the pitch function 74 at any wind speed in which it operates. If the wind turbine can produce more power by slightly increasing the pitch angle $\alpha$, the pitch function 74 can be adjusted by the adaptive control function 72. If increasing the pitch angle $\alpha$ reduces power when an increase is sought, the pitch function 74 can again be corrected by the adaptive control function 72. In like manner, if decreasing the pitch angle $\alpha$ reduces or increases power, the pitch function 74 can be changed accordingly. Hence, by slightly changing the pitch angle $\alpha$ from what the pitch function 74 predicts to be optimal for a given measured wind speed, and then looking at the power function 76 to see if power output increases or decreases relative to what was previously in the database, one can adjust the pitch function 74 as needed to deliver optimal performance. Various algorithms can be developed and implemented in the adaptive control function 72 to allow the system to find and set each data point in the pitch function 74 which offers the highest power yield for the power function 76. This process can repeat itself as often as the designer desires to refine and adjust the pitch function 74 to accommodate short and long term changes in system performance. The number of data points and the range of wind speeds used to define the power function 76 are at the discretion of the designer. Since wind speed is rarely constant during such an evaluation and the associated adjustment assumes a fixed wind speed, the error induced by variations in wind speed during the evaluation act like high frequency noise, enabling the system to iteratively find the near-optimal operational points. While this approach may not offer the theoretically absolute optimum values for performance, it will approach those maximum values with far better accuracy than any predefined set of parameters one could develop.

The designer can choose as many points as desired for definition of the pitch function 74 to establish the resolution desired. Referring back to FIG. 7, the illustrated pitch function 74 uses 70 data points from 5 MPH to 75 MPH in 1 MPH increments. The number of data points and the range of wind speeds used to define the pitch function 74 are at the discretion of the designer. It is important to recognize that there are many means to measure power levels both directly and indirectly and all will have various levels of errors. However, absolute accuracy of the measured power level is unimportant provided it is repeatable, its errors change slowly over time, and any nonlinearities in its accuracy do not create duplicity.

Since the pitch function 74 defines the measured pitch angles at measured wind speeds which offer the best performance, there is now an adaptive control function 72 that the active control system 70 can utilize to create optimal pitch commands at any measured wind speed. Errors in wind speed measurements and pitch angles are embedded in the pitch function 74. Hence, if a system operating under a 12 MPH wind speed theoretically operates best with a pitch angle of 16° but errors in sensor inputs measure the wind speed as 14 MPH and the pitch angle as 15°, it need not matter. The pitch function 74 knows that when the measured wind speed is 14 MPH, a measured pitch angle of 15° offers the best performance. Whether the theoretical prediction is wrong, or the sensors are wrong, or a combination of both, all that is important is the system changes the pitch to the desired erroneously measured pitch angle based on the pitch function 74 to maximize performance at any given erroneously measured wind speed and erroneously measured power level.

The pitch function 74 can be used to operate a single wind turbine or multiple wind turbines. Just as in a single wind turbine, the pitch function 74 can be used to control dozens or hundreds of wind turbines simultaneously by averaging the performance of some or all of them and creating an average pitch function 74 and power function 76. This may be of value in applications where the cost for one or more central control systems is less than many more independent control systems.

In another embodiment of the present invention, an adaptive active control system 68 may utilize two operational data points to detect and correct for sensor errors. In one example, the first of the two points is the measured wind speed and measured pitch angle where the system can begin to produce an acceptable power level. The second point may be the measured wind speed and measured pitch angle where the system begins to reduce the angle of attack and total power output because the blade system can produce too much power. Each of these two points have an associated measured wind speed and measured pitch angle (both erroneous), but are unique because at the one point the system can produce enough power to warrant operation and at the other point the system can produce too much power. The designer may recognize that under certain transient conditions absolute optimum power output between these two points can produce aerodynamic instabilities when the blades are operated too close to their maximum angle of attack α for maximum power production. Hence, the designer can define a mathematical function such as a straight line or some other shape whereby between these two operational points the control system will follow a predefined set of pitch angles based on the values at the two measured end points. For example, if the system began producing power at a measured wind speed of 5 MPH and the best measured pitch angle at that point was 5 degrees, and at a measured wind speed 15 MPH the system reaches maximum power levels with a measured pitch angle of −10 degrees, then at measured wind speeds between these two points the control system defines a pitch angle at measured wind speeds between the two known end points. This relationship could be defined as a straight line between the two end points starting with +5 degrees at 5 MPH and decreasing by (5°−(−15°/(5 MPH-15 MPH) or −1.5°/MPH change in the measured wind speed. A parabolic line could be used or any line shape desired by the designer. The most important aspect is to define the two end points where measurable values can be defined and adjust the pitch function 74 accordingly to retain high energy production between these two end points as the sensor errors change over time.

Example 1

Longer Transmission Life

Figure 10:
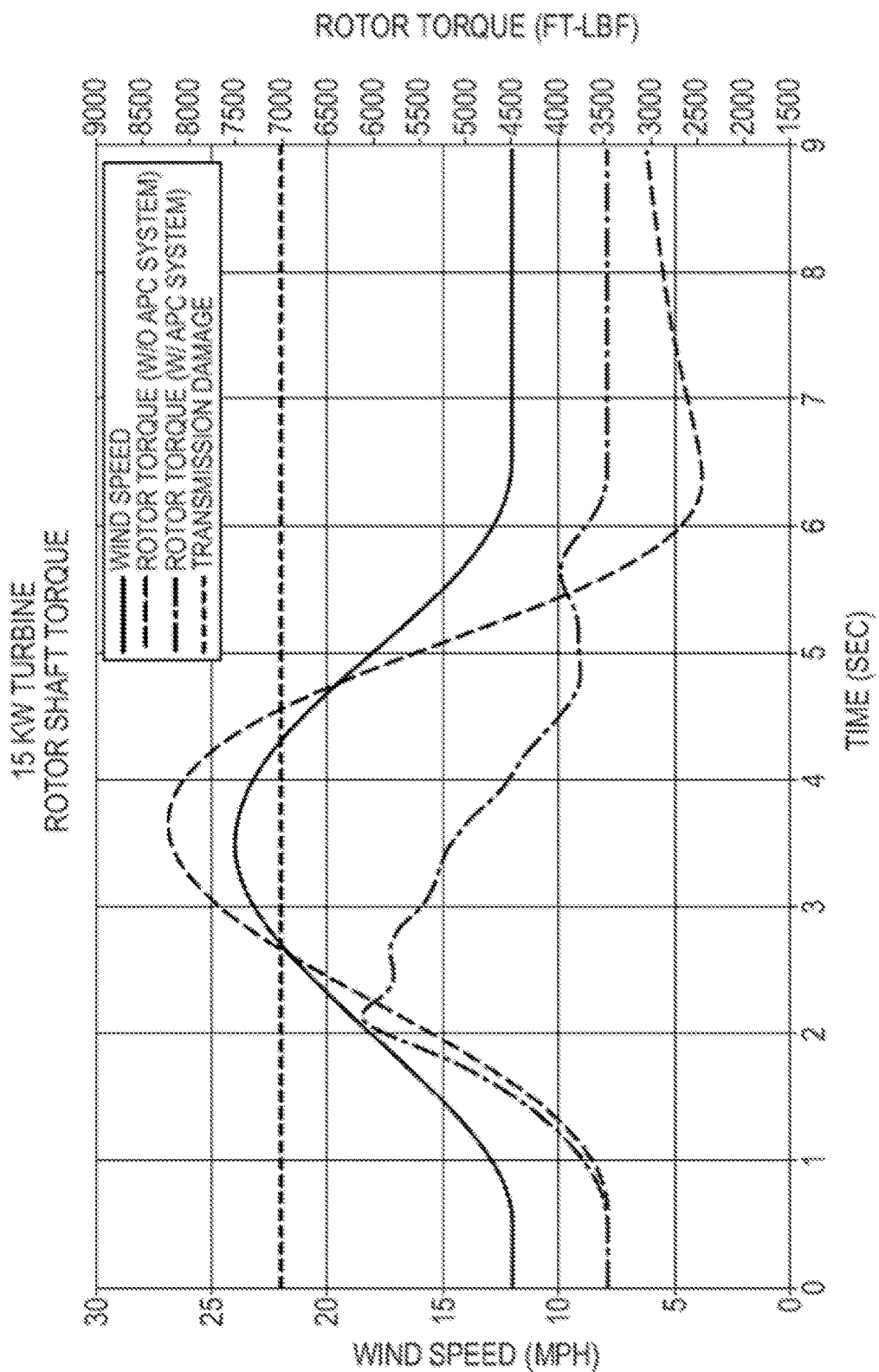
FIGS. 10-12 are graphical representations of rotor shaft torque versus wind speed.
Figure 11:
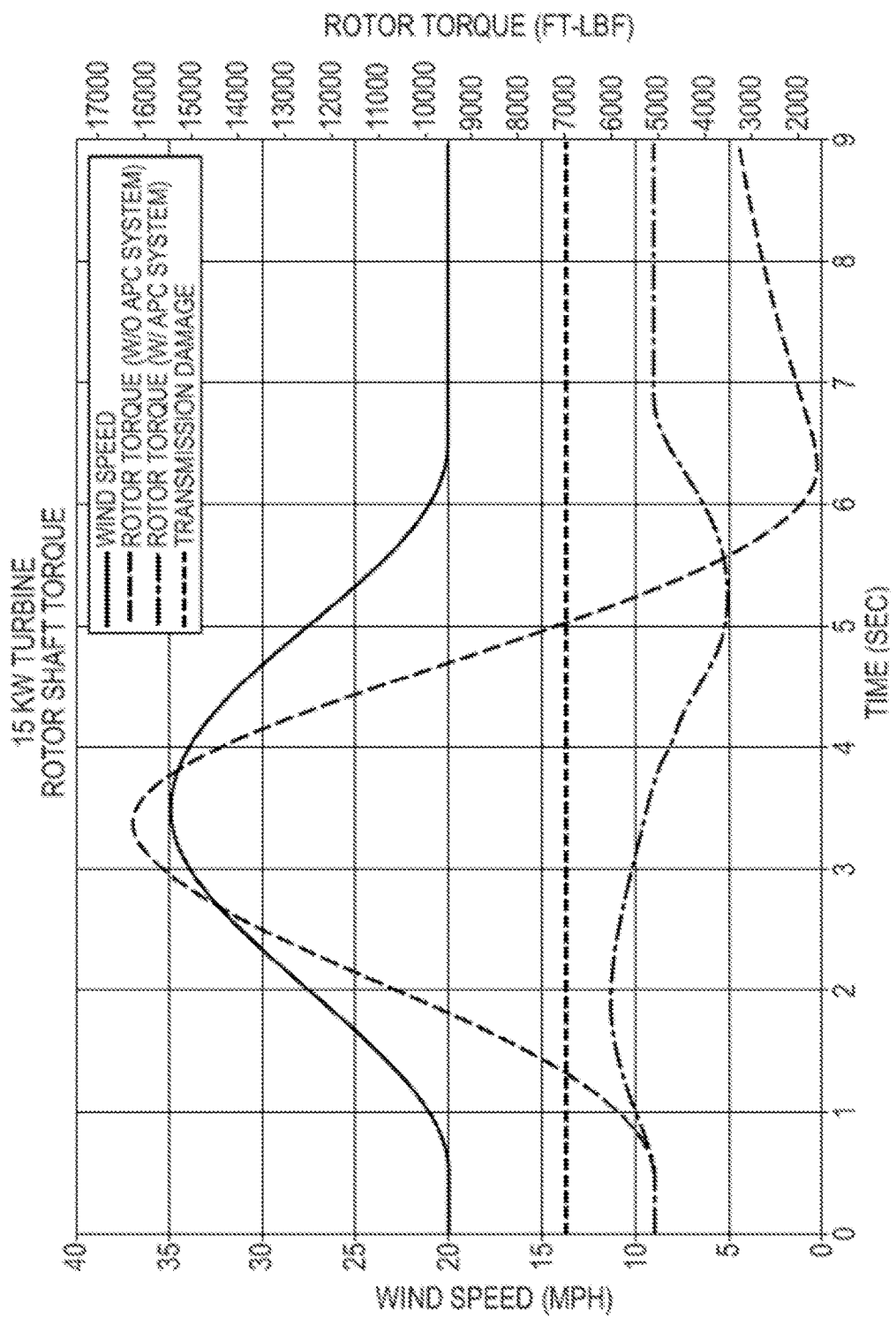
Figure 12:
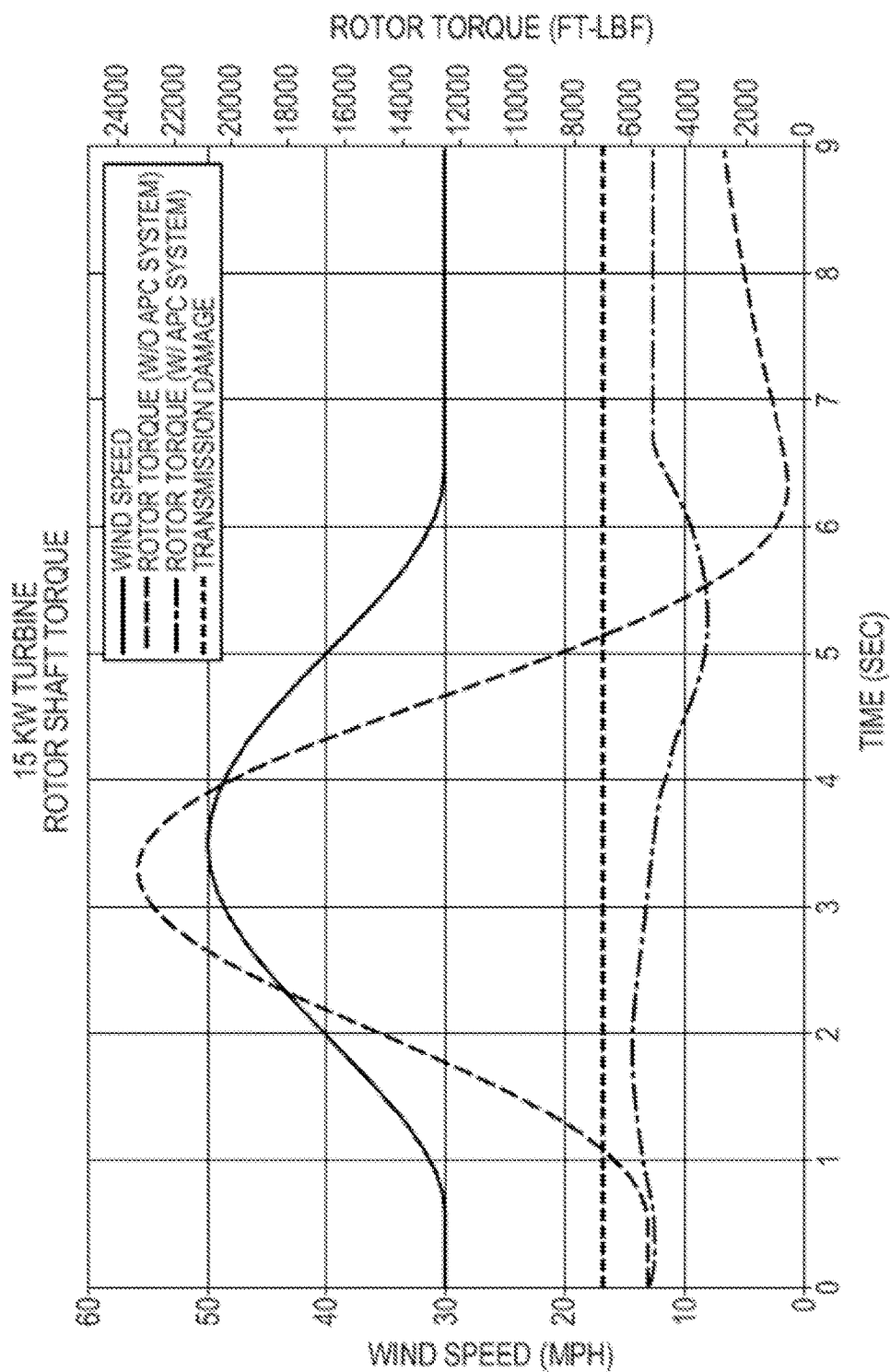

As noted herein, the disclosed an automated pitch control system actively manages energy extracted from the wind using an electro-mechanical systems design approach, thereby preventing damaging torque levels from entering the system. It does this for virtually any wind speed, any gust magnitude, and any gust duration. FIGS. 10-12 graphically depict torque levels which can be expected in a high performance 15 KW turbine design with conventional active pitch control (w/o APC System) and the same turbine with the automated pitch control system (w/o APC System). In FIG. 10, the wind speed starts with a steady state value of 12 mph and peaks at 24 mph 3 seconds later before returning to its steady state value. During this transient, the automated pitch control system manages the wind energy extraction rate, always keeping the torque level below the 7000 Ft-Lb redline. A conventional system simply cannot respond fast enough to offer this level of torque regulation, and as a result imposes transient torque levels above the design limit for the transmission. In FIG. 11, the wind speed starts with a steady state value of 20 mph and peaks at 35 mph 3 seconds later before returning to its steady state value. In FIG. 12, the wind speed starts with a steady state value of 30 mph and peaks at 50 mph 3 seconds later before returning to its steady state value.

Example 2

Longer Generator and Inverter Life

Power regulation is also an important parameter of value. Transient power surges shorten the life of stator windings, electrical switch gear, and inverters. The cost to manufacture the automated pitch control system disclosed herein is less than half the cost of an inverter, and the design further enables use of a low-cost squirrel cage induction generator instead of expensive permanent rare earth magnet generators, offering additional savings. In addition, the design achieved unprecedented automatic pitch control, plus a significantly higher annual energy production.

As prime global wind resources are taken with current turbine technologies, methods must be developed to extract energy from less attractive wind resources. This will most likely require larger airfoil designs. The larger an airfoil is, the more difficult it is to regulate power under transient wind conditions.

One embodiment of the automated pitch control system was developed for a proprietary high performance airfoil with lift coefficients approximately twice those used in current turbine technologies. Coupled with a large rotor diameter for a 15 KW design, an advanced pitch control technology was mandated. Furthermore, the hub sub-system only rotates at about 20 RPM, requiring greater pitch angle changes as a function of wind speed than higher RPM configurations.

Figure 13:
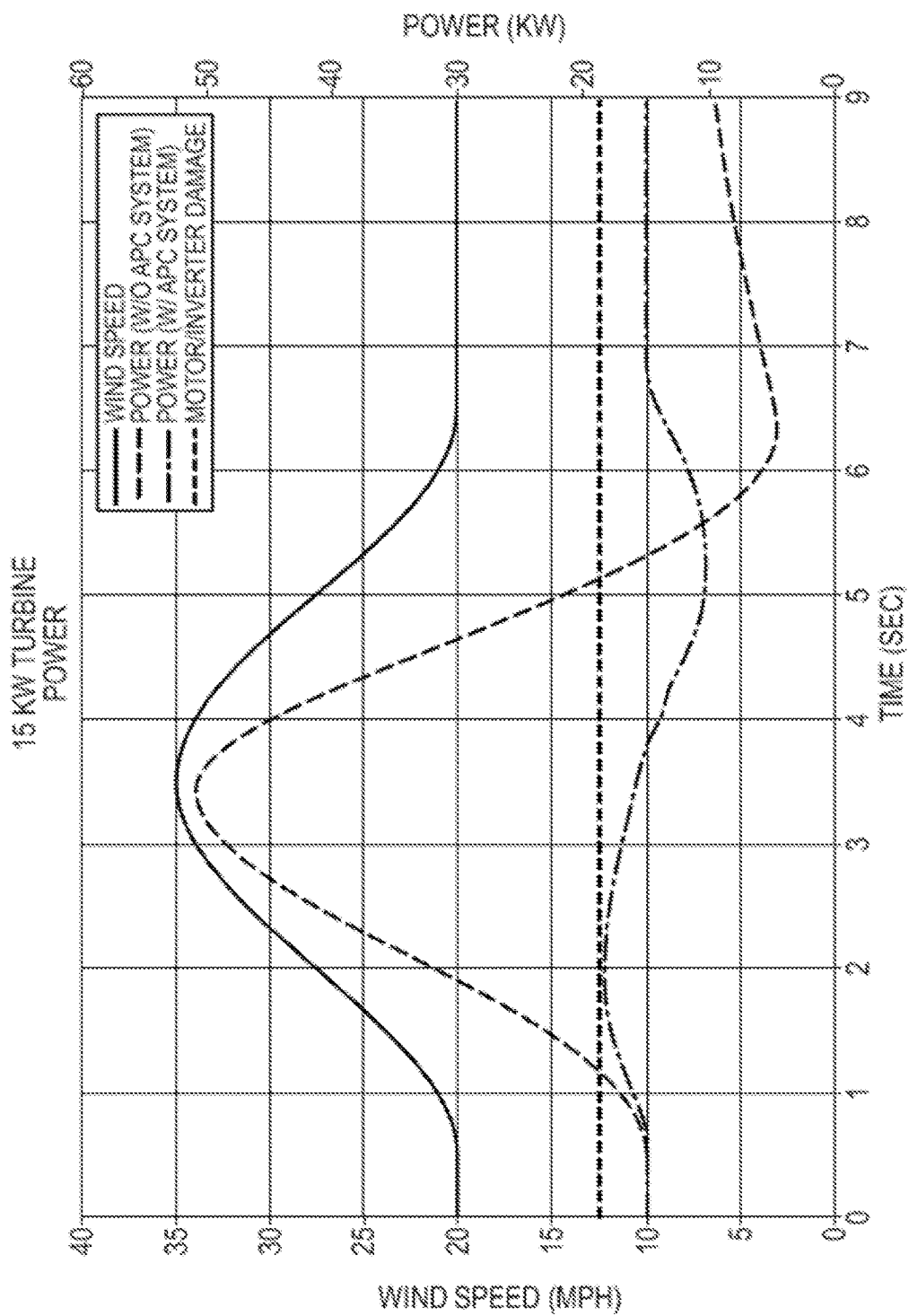
FIGS. 13-15 are graphical representations of turbine power versus wind speed.
Figure 14:
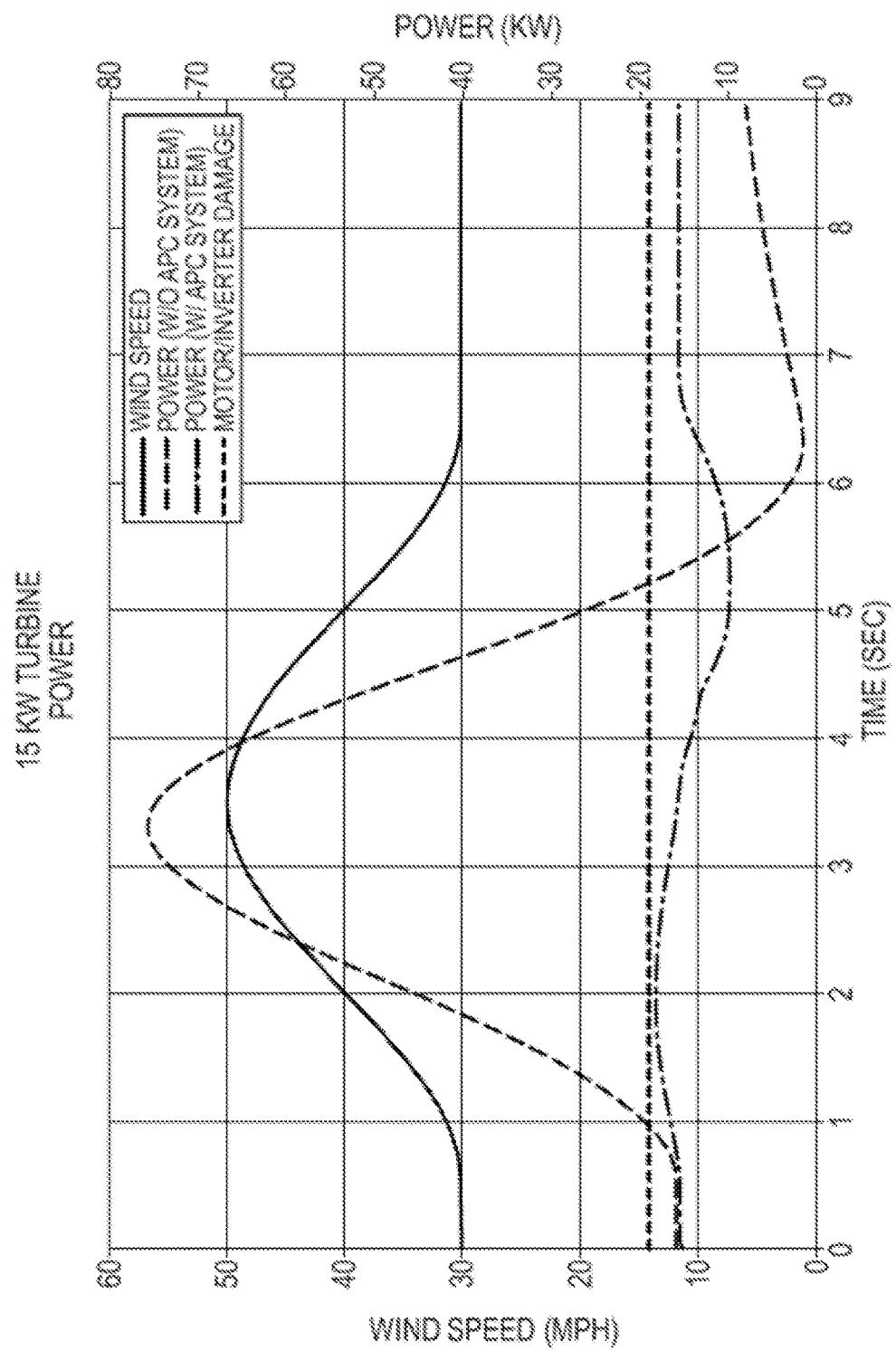
Figure 15:
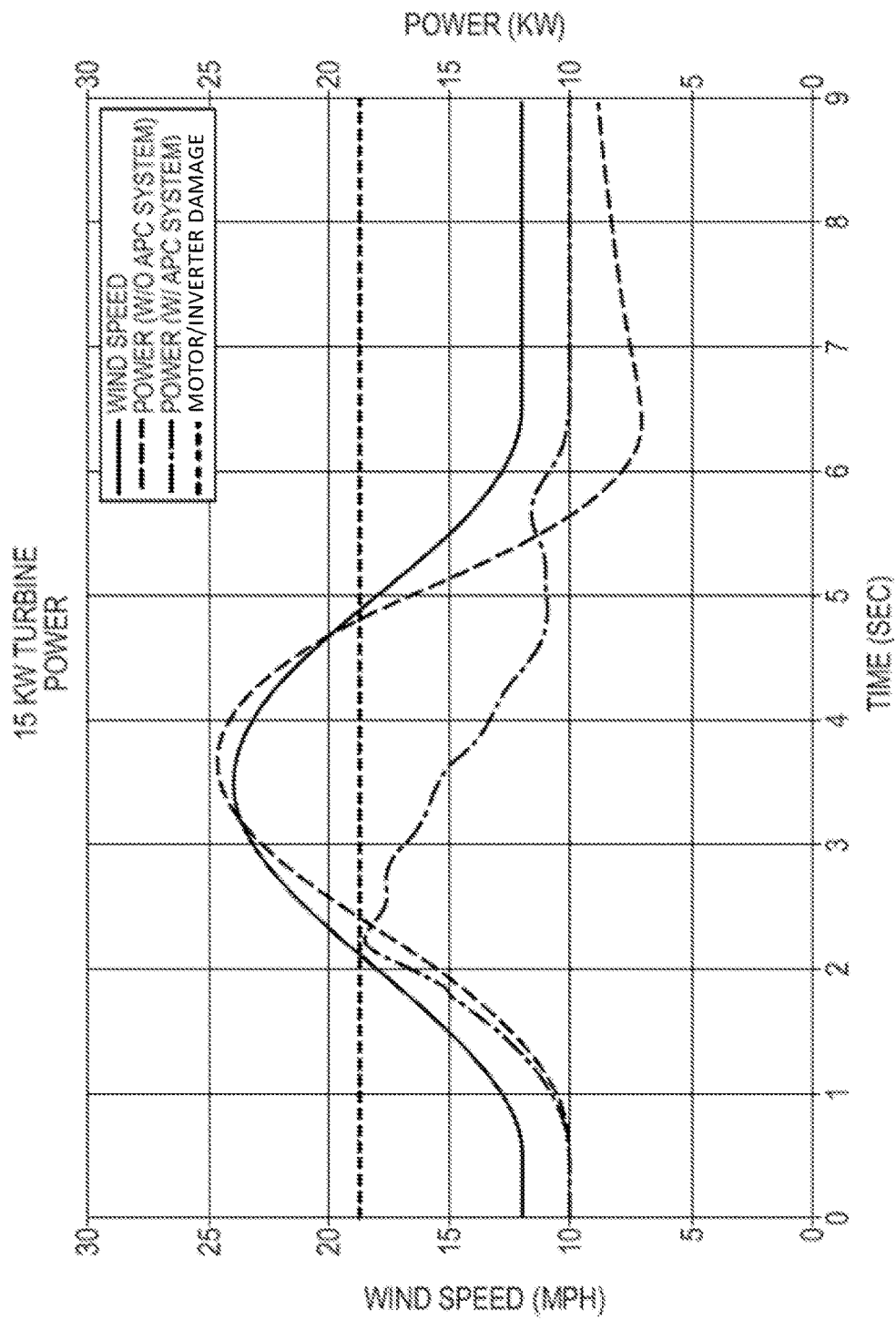

FIGS. 13-15 graphically illustrate the transient power surges absorbed by the motor/inverter in the proprietary turbine design with conventional automatic pitch control (w/o APC System), and with the disclosed automated pitch control system (w/APC System). The short dashed line (Motor/Inverter Damage) illustrates the maximum power that can be pushed through the generator under transient conditions without damage. In all three conditions, the components in the conventional automatic pitch control system suffered power transients well above the design threshold, while power pushed through the inventive automated pitch control system remained below the threshold.

Example 3

Annual Energy Production

Ultimately, real annual energy production is the most important selling point of any turbine design. The wind turbine design disclosed herein has reasonably high power levels at low wind speeds, and limits power levels at higher wind speeds. When manufacturing, installation, operation, and maintenance costs are balanced against annual energy production, a turbine design offering great performance at less than optimal wind conditions becomes very significant.

However, an advanced pitch control system should do more than just regulate power and torque. It should maximize annual energy production. This cannot be achieved with current technologies because current pitch control technologies assume sensor input values are correct. As noted herein, this is not a valid assumption.

An ideal pitch control system would achieve optimum pitch angles for every wind speed to maximize the annual energy production. Typically this is attempted using sensors for pitch angles and yaw, an anemometer to sense wind velocity, and possibly a predefined database which identifies optimal pitch angles as a function of wind velocity. Unfortunately, these sensing systems including the predefined database are riddled with errors and as such, cannot by themselves offer the maximum annual energy production for the system.

Aside from inaccuracies inherent in anemometers due to bias errors, scale factor errors, shading effects imposed by the passing blades, and local vortices, one also must address the fact that the point at which the wind velocity is measured is not an accurate representation of the actual wind speed for all of the blade element sections. Across the diameter of the rotor there are gradients in wind speed, and where each rotor falls within that gradient will determine its available power output. The only valid assumption one can make regarding current wind speed measurement is that the value is wrong.

Sensors measuring the pitch angles have a similar set of shortcomings. Aside from the bias and scale factor errors, there are also errors inherent in actual blade pitch versus assumed blade pitch, due to mechanical tolerances and the fact that the twist in the blade may change as a function of wind speed. Again, the only valid assumption one can make is the pitch measurements are wrong.

In addition to sensor errors present on the first day of operation, it is reasonable to expect those errors to change with time due to sensor wear, electronic drift, and seasonal changes in temperature and air density.

Figure 16:
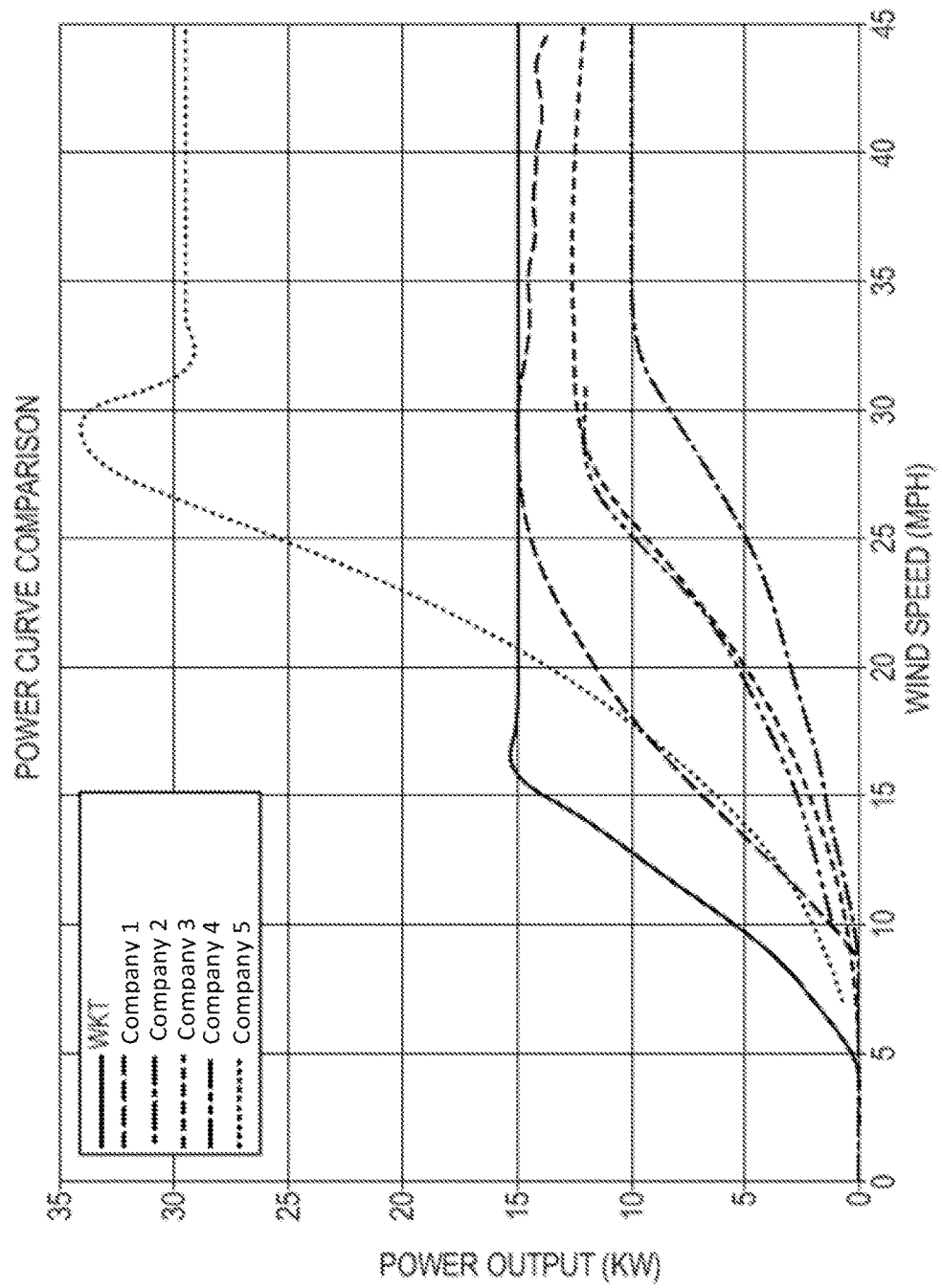
FIG. 16 is a graphical representation of a power curve comparison.
Figure 17:
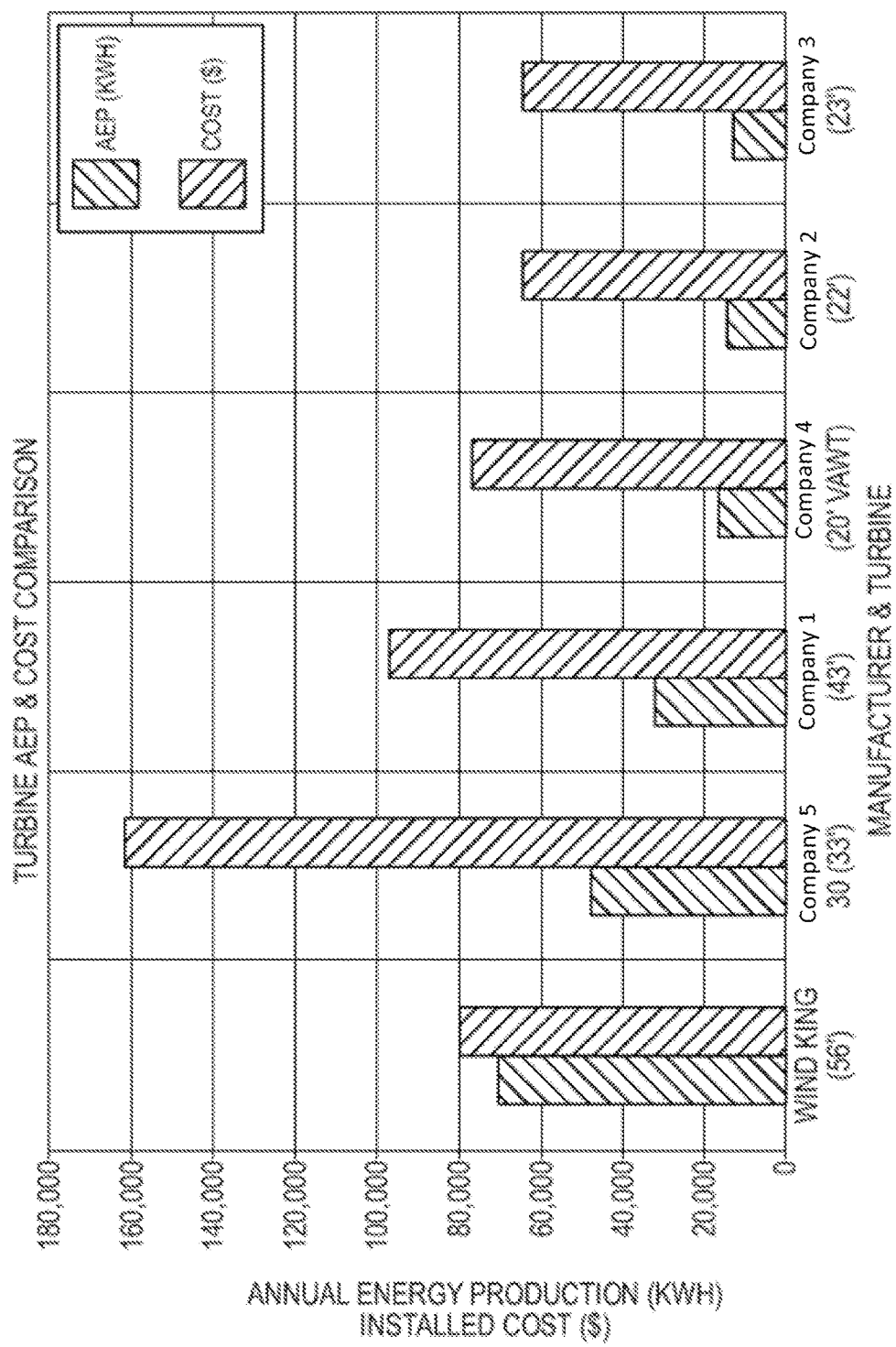
FIG. 17 is a graphical representation of wind turbine AEP and cost.

The disclosed automated pitch control system assumes all sensor inputs are wrong, constantly corrects the sensors, and delivers maximum power levels all year long, year after year. FIG. 16 graphically illustrates a power curve comparison chart for several small, commercially available turbine designs on their first day of operation relative to the disclosed 15 KW design (WKT) with the automated pitch control system. As noted, the WKT design reaches rated power at a lower wind speed than the other designs, so it is able to extract more wind energy in the lower wind speed regimes. FIG. 17 graphically illustrates the annual energy production (AEP) for each of the wind turbines in FIG. 16. Even though the WKT (Wind King) design caps power output at 15 kW, its annual energy production is much higher, leading to a better value proposition.

Example 4

Reduced Magnitudes in Transient Thrust Variations

Figure 18:
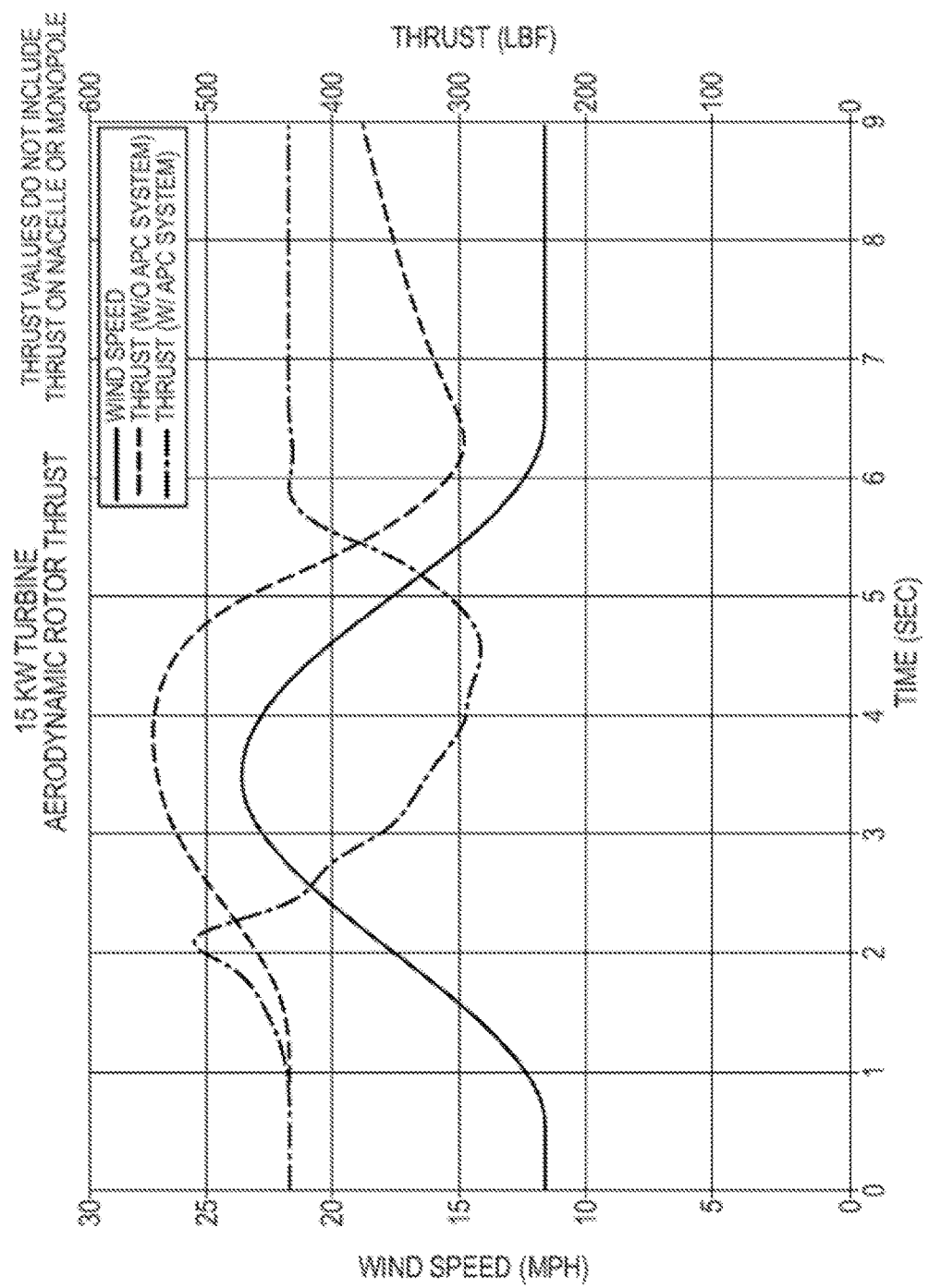
FIGS. 18-20 are graphical representations of aerodynamic thrust loads.
Figure 19:
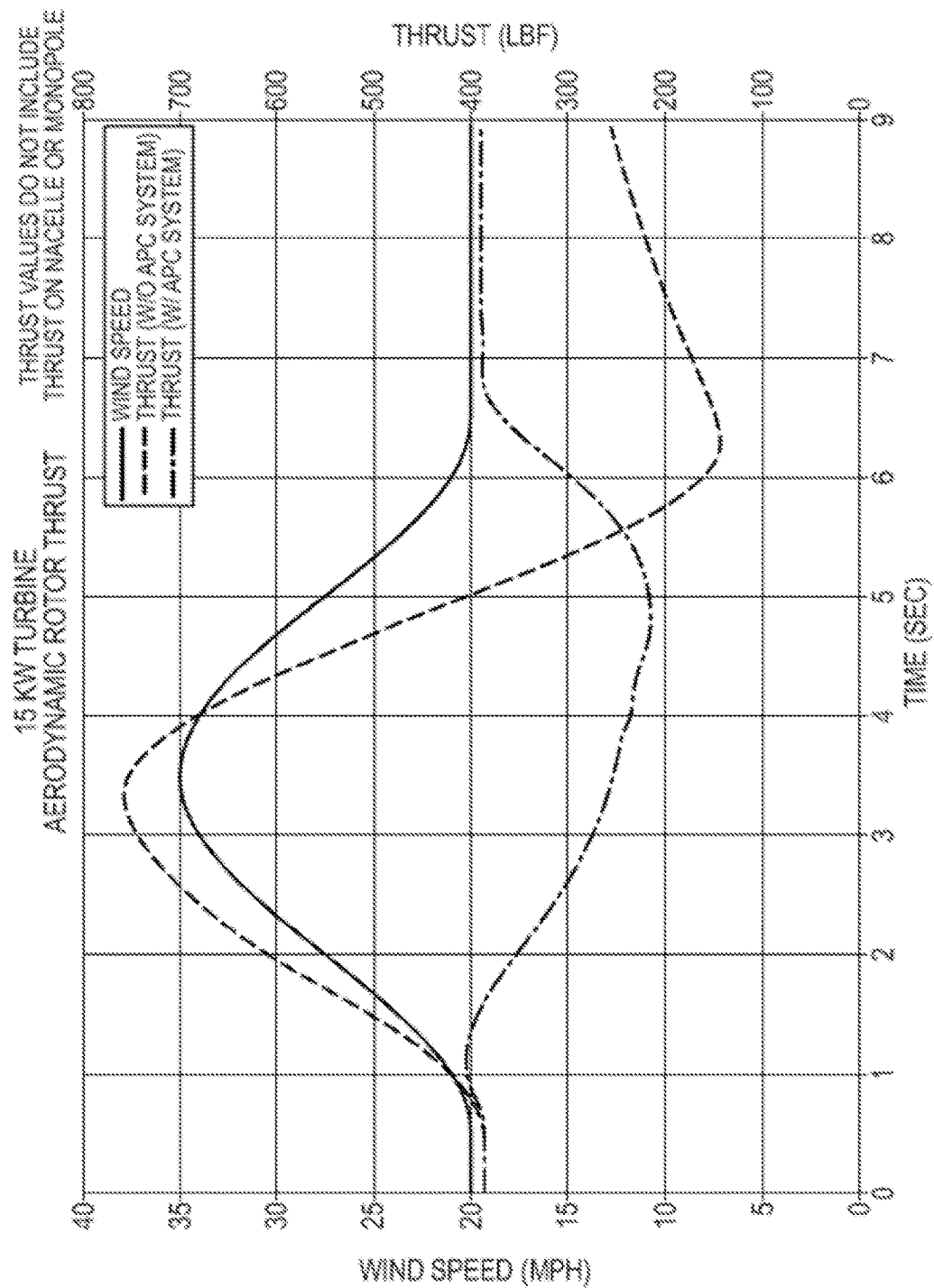
Figure 20:
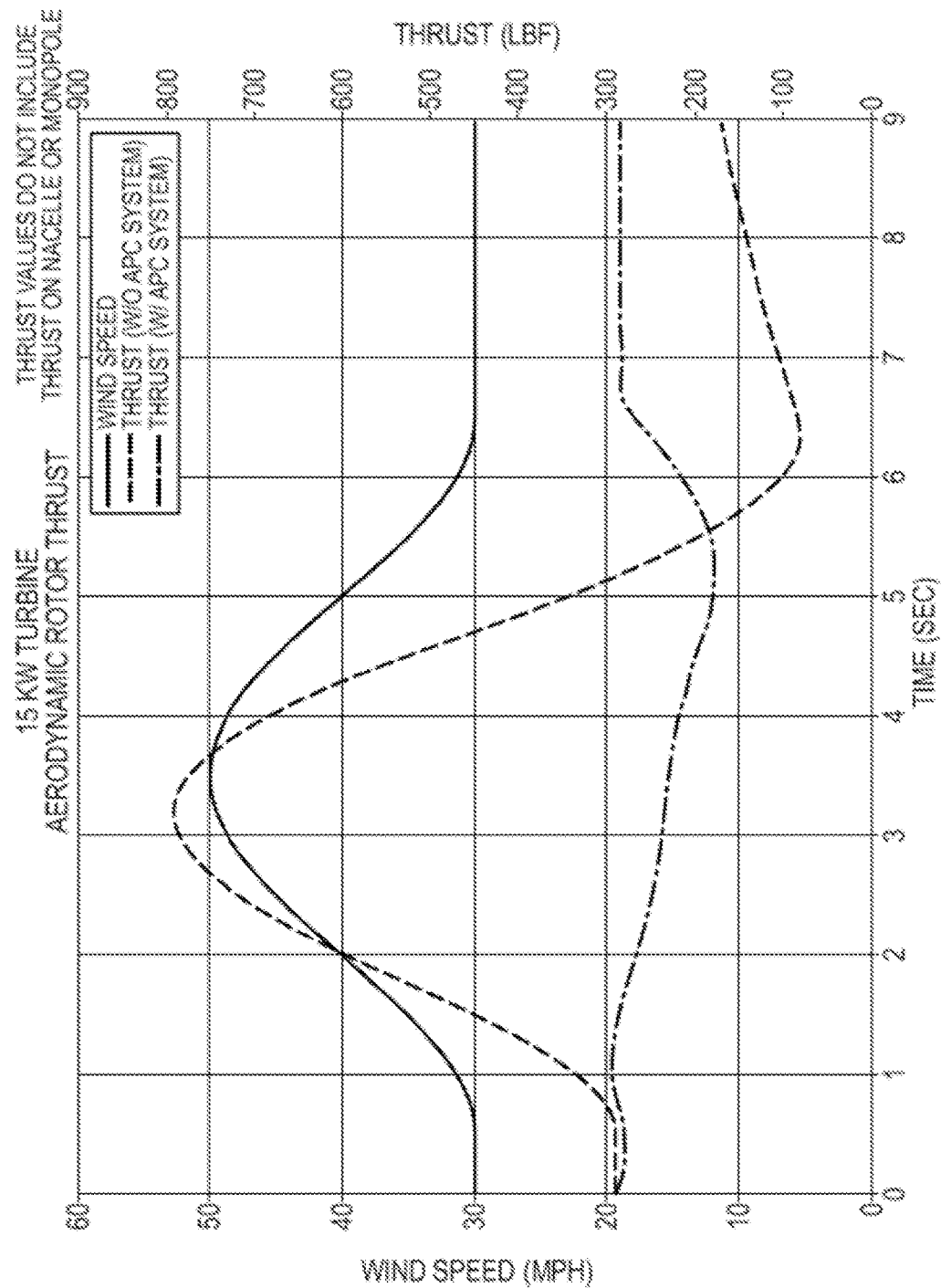

An ideal wind turbine would produce a constant thrust at all wind speeds and gust conditions above its maximum power limit. The disclosed automated pitch control system significantly reduces thrust variations under transient wind conditions, although at the present time it cannot eliminate them. FIGS. 18-20 graphically illustrate thrust loads on the rotor blades under three different transient wind conditions. Reducing the angle of attack in a timely manner during transient wind conditions reduces the drag on the airfoils while simultaneously reducing torque and power output levels. While thrusts on the monopole and nacelle are not included in the thrust charts, the total thrust load would have a smaller variance if they were included since the thrust on the monopole and nacelle would increase while the thrust on the airfoils decrease. Reduced thrust loads can offer the potential to reduce tower costs, which are one of the largest single line items in terms of cost for a wind turbine. This thrust reduction may also be of interest for offshore deep water platform based systems which are much less tolerant of transient wind conditions.

The disclosed automated pitch control system is electro-mechanically simple, offers significant reductions in total manufacturing cost, and offers unprecedented power regulation and pitch control while enabling the following benefits: longer transmission life; longer generator and inverter life; significantly higher annual energy production; reduced magnitudes in transient thrust variations; significantly larger blades with larger swept rotor diameters; bird and bat safe low RPM designs that do not kill endangered species; improved low wind speed designs for wind resource limited locations; more uniform power production for better grid utilization; and significantly improved regulation of power and torque output. The disclosed automated pitch control system is expected to save manufactures and customers between $50,000 and $100,000 per megawatt per year. Although the disclosed automated pitch control system was primarily intended for use with fixed speed wind turbines, it can also be used on variable speed wind turbines.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A wind turbine, comprising:
   a hub sub-system comprising a main hub and a shaft adapted to rotate about an axis;
   a plurality of turbine blades having a pitch angle defined by an angle between a chord line of a turbine blade and a vector representing oncoming wind, the blades adapted to drive the rotation of the hub sub-system to a first speed;
   a pitch drive sub-system comprising a driving element adapted to rotate about the axis at a second speed, the driving element adapted to control the pitch angle of the turbine blades in relation to a difference between the first speed and the second speed;
   a generator with a slip function, wherein the generator with the slip function is a generator with slip, a slip-enhanced generator, a variable speed generator, a generator with a clutch, a generator with a transmission, or a combination thereof, the generator with the slip function enabling the hub sub-system to increase the first speed as power increases and to decrease the first speed as power decreases; and
   an active control system adapted to control the second speed of the driving element, wherein
      an increase in the first speed relative to the second speed causes the pitch angle to decrease, and/or
      a decrease in the first speed relative to the second speed causes the pitch angle to increase.

2. The wind turbine of claim 1, wherein the driving element of the pitch drive sub-system comprises a driving gear configured to rotate at the second speed, the wind turbine further comprising a driven gear coupled to the driving gear, the driven gear configured to translate the difference in speeds between the hub sub-system and the pitch drive sub-system to a change in the pitch angle of the turbine blades.

3. The wind turbine of claim 2, wherein the driven gear comprises a plurality of gears.

4. The wind turbine of claim 2, wherein the driving gear and the driven gear are bevel gears.

5. The wind turbine of claim 1, wherein the driving element of the pitch drive sub-system comprises a shaft configured to rotate at the second speed, the wind turbine further comprising a mechanical linkage coupled to the shaft, the mechanical linkage configured to translate the difference in speeds between the hub sub-system and the pitch drive sub-system to a change in the pitch angle of the turbine blades.

6. The wind turbine of claim 5, wherein the mechanical linkage comprises spokes and rods.

7. The wind turbine of claim 1, wherein the driving element of the pitch drive sub-system comprises a drive belt, pulley, or a system of hydraulic or electromechanical devices.

8. The wind turbine of claim 1, wherein the slip enhanced generator comprises a squirrel cage induction generator.

9. The wind turbine of claim 1, wherein the slip function is provided by a generator control system.

10. A method for controlling a wind turbine blade pitch angle, comprising:
    providing a hub sub-system comprising a main hub and a shaft;
    providing a plurality of turbine blades having a pitch angle defined by an angle between a chord line of a turbine blade and a vector representing oncoming wind;
    driving, by the turbine blades, the rotation of the hub sub-system about an axis to a first speed;
    providing a pitch drive sub-system comprising a driving element adapted to rotate about the axis independently from the hub sub-system;
    controlling, by an active control system, the driving element to rotate at a second speed; and
    controlling the pitch angle of the turbine blades by the driving element when the first speed is different from the second speed, wherein
        an increase in the first speed relative to the second speed causes the driving element to decrease the pitch angle, and/or
        a decrease in the first speed relative to the second speed causes the driving element to increase the pitch angle.

11. The method of claim 10, comprising: providing a generator with a slip function, wherein the generator with the slip function is a generator with slip, a slip-enhanced generator, a variable speed generator, a generator with a clutch, a generator with a transmission, or a combination thereof; and
    coupling the generator with the slip function to the hub sub-system and the pitch drive sub-system,
    the generator with the slip function enabling the hub sub-system to increase speed as power increases and decrease speed as power decreases.

12. The method of claim 11, further comprising controlling the driving element with an adaptive active control system.

13. The method of claim 11, wherein the driving element of the pitch drive sub-system comprises a driving gear configured to rotate at the second speed, the method further comprising providing a driven gear coupled to the driving gear, the driven gear configured to translate the difference in speeds between the hub sub-system and the pitch drive sub-system to a change in the pitch angle of the turbine blades.

14. The method of claim 11, wherein the driving element of the pitch drive sub-system comprises a shaft configured to rotate at the second speed, the method comprising providing a mechanical linkage coupled to the shaft, the mechanical linkage configured to translate the difference in speeds between the hub sub-system and the pitch drive sub-system to a change in the pitch angle of the turbine blades.

15. The method of claim 11, wherein the driving element of the pitch drive sub-system comprises a drive belt, pulley, or a system of hydraulic or electromechanical devices.

16. The method of claim 10, further comprising controlling the driving element with an adaptive active control system.

17. The method of claim 16, wherein the adaptive active control system assumes all sensor values are incorrect, and wherein controlling the driving element comprises compensating for incorrect sensor values.

18. The method of claim 17, wherein compensating comprises storing a pitch function in a database, the pitch function correlating measured sensor values to a maximum power output.

19. The method of claim 10, wherein the driving element of the pitch drive sub-system comprises a driving gear configured to rotate at the second speed, the method further comprising providing a driven gear coupled to the driving gear, the driven gear configured to translate the difference in speeds between the hub sub-system and the pitch drive sub-system to a change in the pitch angle of the turbine blades.

20. The method of claim 19, wherein the driving gear and the driven gear are bevel gears.

21. The method of claim 19, wherein the driven gear comprises a plurality of gears.

22. The method of claim 10, wherein the driving element of the pitch drive sub-system comprises a shaft configured to rotate at the second speed, the method comprising providing a mechanical linkage coupled to the shaft, the mechanical linkage configured to translate the difference in speeds between the hub sub-system and the pitch drive sub-system to a change in the pitch angle of the turbine blades.

23. The method of claim 22, wherein the mechanical linkage comprises spokes and/or rods.

24. The method of claim 10, wherein the driving element of the pitch drive sub-system comprises a drive belt, pulley, or a system of hydraulic or electromechanical devices.

* * * * *